(12) United States Patent
Grant et al.

(10) Patent No.: US 9,276,438 B2
(45) Date of Patent: Mar. 1, 2016

(54) UNIVERSAL POWER TOOL BATTERY PACK COUPLED TO A PORTABLE INTERNAL COMBUSTION ENGINE

(71) Applicant: BLACK & DECKER INC., Newark, DE (US)

(72) Inventors: Jeffrey P. Grant, Forest Hill, MD (US); Michael K. Forster, White Hall, MD (US)

(73) Assignee: BLACK & DECKER INC., New Britain, CT (US)

(*) Notice: Subject to any disclaimer, the term of this patent is extended or adjusted under 35 U.S.C. 154(b) by 0 days.

(21) Appl. No.: 14/299,672

(22) Filed: Jun. 9, 2014

(65) Prior Publication Data

US 2014/0284936 A1    Sep. 25, 2014

Related U.S. Application Data

(60) Division of application No. 13/193,818, filed on Jul. 29, 2011, now Pat. No. 8,759,991, which is a division of application No. 12/107,807, filed on Apr. 23, 2008, now Pat. No. 7,989,969, which is a
(Continued)

(51) Int. Cl.
*H02J 7/14* (2006.01)
*F02B 63/04* (2006.01)
(Continued)

(52) U.S. Cl.
CPC .............. *H02J 7/1415* (2013.01); *F02B 63/04* (2013.01); *F02B 63/047* (2013.01); *F02N 11/0862* (2013.01); *F02N 11/14* (2013.01)

(58) Field of Classification Search
USPC ................ 290/1 A, 34, 38 R; 322/10, 16, 29; 439/504, 500; 320/112, 114, 137
See application file for complete search history.

(56) References Cited

U.S. PATENT DOCUMENTS

| 1,705,673 A | 3/1929 | Menzies et al. |
| 2,314,687 A | 3/1943 | Carlson |

(Continued)

FOREIGN PATENT DOCUMENTS

| DE | 29821825 | 12/1998 |
| EP | 0338512 | 10/1989 |

(Continued)

OTHER PUBLICATIONS

Communication Relating to the Results of the Partial International Search Report, PCT/US03/17606.
(Continued)

*Primary Examiner* — Julio Gonzalez Ramirez
(74) *Attorney, Agent, or Firm* — Harness, Dickey & Pierce, P.L.C.

(57) ABSTRACT

A portable internal combustion engine and a charging device that generates AC power are supported on a manually movable frame. A coupling mechanism which can include a starter circuit and starting device, or a charging circuit and charging device, or both device couples a battery receptacle terminal block to the internal combustion engine. The battery receptacle can include various features to permit and retain electrical coupling between a battery pack for a cordless power tool. For example, key protrusions and corresponding recesses can be associating with latching projections. Additionally or alternatively, cooperating rails and recesses may be associated with the battery pack and receptacle, respectively. Spring loaded movable clips or resilient flexing clips can be included to act on the battery pack. An electrical cord may also be used to couple receptacle terminals to the coupling mechanism.

10 Claims, 30 Drawing Sheets

Related U.S. Application Data continuation-in-part of application No. 11/526,825, filed on Sep. 25, 2006, now Pat. No. 7,687,926, which is a continuation-in-part of application No. 11/321,773, filed on Dec. 29, 2005, now Pat. No. 7,309,928, which is a continuation-in-part of application No. 10/453,988, filed on Jun. 4, 2003, now Pat. No. 7,180,200.

(60) Provisional application No. 60/386,904, filed on Jun. 6, 2002, provisional application No. 60/727,201, filed on Oct. 14, 2005.

(51) Int. Cl.
*F02N 11/14* (2006.01)
*F02N 11/08* (2006.01)

(56) References Cited

U.S. PATENT DOCUMENTS

| | | |
|---|---|---|
| 2,444,460 A | 7/1948 | Moncrief |
| 2,526,671 A | 10/1950 | Kober |
| 3,217,224 A | 11/1965 | Sherwood |
| 3,366,869 A | 1/1968 | Young |
| 3,444,460 A | 5/1969 | Penney |
| 3,456,119 A | 7/1969 | Schneider |
| 3,518,445 A | 6/1970 | Wichman |
| 3,660,671 A | 5/1972 | Peterson |
| 3,671,851 A | 6/1972 | Harkness |
| 3,908,161 A | 9/1975 | Messenger |
| 4,122,354 A | 10/1978 | Howland |
| 4,181,929 A | 1/1980 | Barber et al. |
| RE31,216 E | 4/1983 | Hairgrove, Sr. |
| 4,743,777 A | 5/1988 | Shilling et al. |
| 4,772,802 A | 9/1988 | Glennon et al. |
| 4,786,852 A | 11/1988 | Cook |
| 4,830,412 A | 5/1989 | Raad et al. |
| 4,862,551 A | 9/1989 | Martinez et al. |
| 4,883,973 A | 11/1989 | Lakey et al. |
| 4,907,546 A | 3/1990 | Ishii et al. |
| 4,947,100 A | 8/1990 | Dhyanchand et al. |
| 4,965,477 A | 10/1990 | Stadler et al. |
| 4,988,584 A | 1/1991 | Shaper |
| 5,012,177 A | 4/1991 | Dhyanchand |
| 5,013,929 A | 5/1991 | Dhyanchand |
| 5,038,095 A | 8/1991 | Kirchberg et al. |
| 5,065,086 A | 11/1991 | Takakado |
| 5,091,679 A | 2/1992 | Murty et al. |
| 5,111,127 A | 5/1992 | Johnson |
| 5,132,604 A | 7/1992 | Shimane et al. |
| 5,144,217 A | 9/1992 | Gardner et al. |
| 5,159,259 A | 10/1992 | Hart et al. |
| 5,162,662 A | 11/1992 | Nakayama |
| 5,166,596 A | 11/1992 | Goedken |
| 5,175,439 A | 12/1992 | Harer et al. |
| 5,208,525 A * | 5/1993 | Lopic et al. ............ 320/112 |
| 5,212,952 A | 5/1993 | Yokoyama et al. |
| 5,325,042 A | 6/1994 | Murugan |
| 5,341,644 A | 8/1994 | Nelson |
| 5,383,605 A | 1/1995 | Teague |
| 5,533,671 A | 7/1996 | Baer |
| 5,548,471 A | 8/1996 | Roederer |
| 5,561,330 A | 10/1996 | Crook |
| 5,570,001 A | 10/1996 | Fenley |
| 5,629,602 A | 5/1997 | Makino |
| 5,663,011 A | 9/1997 | Bunyea et al. |
| 5,689,174 A | 11/1997 | Pacheco, Sr. |
| 5,745,043 A | 4/1998 | Lemke et al. |
| 5,751,070 A | 5/1998 | Nagao et al. |
| 5,787,693 A | 8/1998 | Dyke |
| 5,794,580 A | 8/1998 | Galletti |
| 5,861,604 A | 1/1999 | McLean et al. |
| 5,902,094 A | 5/1999 | Hoenisch et al. |
| 5,920,161 A | 7/1999 | Obara et al. |
| 5,929,537 A | 7/1999 | Glennon |
| 5,954,494 A | 9/1999 | Goldsmith et al. |
| 5,986,340 A | 11/1999 | Mostafazadeh et al. |
| 5,998,976 A | 12/1999 | Steffan |
| 6,000,370 A | 12/1999 | Rickard |
| 6,007,373 A | 12/1999 | Chew |
| 6,008,545 A | 12/1999 | Nagano et al. |
| 6,034,511 A | 3/2000 | Scott et al. |
| 6,075,341 A * | 6/2000 | White et al. ............ 320/114 |
| 6,075,459 A | 6/2000 | Saarem et al. |
| 6,084,313 A | 7/2000 | Frank |
| 6,100,599 A | 8/2000 | Kouchi et al. |
| 6,118,186 A | 9/2000 | Scott et al. |
| 6,137,251 A | 10/2000 | Huang et al. |
| 6,140,797 A | 10/2000 | Dunn |
| 6,160,373 A | 12/2000 | Dunn et al. |
| 6,166,525 A | 12/2000 | Crook |
| 6,191,552 B1 | 2/2001 | Kates et al. |
| 6,200,277 B1 | 3/2001 | Kensey |
| 6,202,776 B1 | 3/2001 | Masberg et al. |
| 6,260,578 B1 | 7/2001 | Kuehnemund et al. |
| 6,265,091 B1 | 7/2001 | Pierson et al. |
| 6,265,786 B1 | 7/2001 | Bosley et al. |
| 6,308,059 B1 | 10/2001 | Domes |
| 6,313,543 B1 | 11/2001 | Frank |
| 6,326,101 B1 | 12/2001 | White et al. |
| 6,380,719 B2 | 4/2002 | Underwood et al. |
| 6,392,312 B1 | 5/2002 | Morris |
| 6,525,511 B2 * | 2/2003 | Kubale et al. ............ 320/112 |
| 6,599,072 B1 | 7/2003 | Gerhard |
| 6,600,136 B1 | 7/2003 | Morris et al. |
| 6,639,370 B1 | 10/2003 | Gabrys |
| 6,644,264 B2 | 11/2003 | Shoemaker |
| 6,653,815 B2 | 11/2003 | Watson et al. |
| 6,801,425 B2 | 10/2004 | Buck et al. |
| 6,806,680 B2 | 10/2004 | Zeiler |
| 6,876,173 B2 | 4/2005 | Mastaler et al. |
| 6,915,583 B2 | 7/2005 | El-Katcha et al. |
| 6,924,620 B2 | 8/2005 | Santana, Jr. |
| 6,952,056 B2 | 10/2005 | Brandenburg et al. |
| 6,986,340 B2 | 1/2006 | Gracyalny et al. |
| 7,005,831 B2 | 2/2006 | Watson et al. |
| 7,104,847 B2 | 9/2006 | Sodemann et al. |
| 7,148,580 B2 | 12/2006 | Sodemann et al. |
| 7,160,644 B2 | 1/2007 | White et al. |
| 7,164,267 B2 | 1/2007 | Prammer et al. |
| 7,180,200 B2 | 2/2007 | Walter et al. |
| 7,183,745 B2 * | 2/2007 | Kubale et al. ............ 320/114 |
| 7,309,928 B2 | 12/2007 | Grant et al. |
| 7,687,926 B2 | 3/2010 | Grant et al. |
| 7,989,969 B2 | 8/2011 | Grant et al. |
| 8,759,991 B2 | 6/2014 | Grant et al. |
| 2001/0043052 A1 | 11/2001 | Griffey et al. |
| 2002/0125857 A1 | 9/2002 | Mastaler et al. |
| 2003/0117107 A1 | 6/2003 | Zick et al. |
| 2004/0007402 A1 | 1/2004 | Kujawa |
| 2004/0012204 A1 | 1/2004 | Walter et al. |
| 2004/0080300 A1 | 4/2004 | Xu et al. |
| 2005/0031944 A1 | 2/2005 | Sodemann et al. |
| 2005/0040254 A1 | 2/2005 | Chang |
| 2005/0191183 A1 | 9/2005 | Kawakami et al. |
| 2005/0225288 A1 | 10/2005 | Cole et al. |
| 2005/0280393 A1 | 12/2005 | Feldmann |
| 2006/0231644 A1 | 10/2006 | Breedlove et al. |
| 2007/0120366 A1 | 5/2007 | Grant et al. |
| 2007/0182158 A1 | 8/2007 | Cerney et al. |

FOREIGN PATENT DOCUMENTS

| | | |
|---|---|---|
| EP | 488108 | 6/1992 |
| EP | 1060800 | 12/2000 |
| EP | 1138938 | 10/2001 |
| WO | WO-9821805 | 5/1998 |

OTHER PUBLICATIONS

Milwaukee Product Catalog, 18 Volt Battery 48-11-2230; http://www.milwaukeetool.com/ProductDetail.aspx?ProductId=48-11-2230&-CategoryName=SC%3A+Batteries+-+18+Volt.

(56) References Cited

OTHER PUBLICATIONS

Milwaukee Product Catalog, 18 Volt Battery 48/11/2230; http://www.milwaukeetool.com/ProductDetail.aspx?ProductId=48-11-2230&-CategoryName=SC%3A+Batteries+-+18+Volt.

Milwaukee Service Parts List; 18 Volt Battery; Catalog No. 48-11-1830, Serial Nos. A95A & A95B; Milwaukee Electric Tool Corporation, Bulletin No. 54-04-7030, Drawing 3, Mar. 2003.

Milwaukee Service Parts List; 18 Volt Battery; Catalog No. 48-11-1830, Serial Nos. A95A & A95B; Milwaukee Electric Tool Corporation, Bulletin No. 54-04-7030, Drawing Mar. 3, 2003.

Milwaukee Service Parts List; 28 Volt Battery; Catalog No. 48-11-2830, Serial Nos. A71A, A71B, A71C & A71D; Milwaukee Electric Tool Corporation, Bulletin No. 54-04-7010, Drawing 2, Feb. 2007.

Milwaukee Service Parts List; 28 Volt Battery; Catalog No. 48-11-2830, Serial Nos. A71A, A71B, A71C & A71D; Milwaukee Electric Tool Corporation, Bulletin No. 54/-04-7010, Drawing Feb. 2, 2007.

Rigid 18V Lithium-Ion Battery Pack; R84008, R840084; One World Technologies Inc., 987000-022, Jan. 18, 2008 (REV:01).

Ryobi Product Catalog, 12 Volt Lithium-Ion Battery Pack, Model CB120L; www.ryobitools.com/catalog/accessories/batteries.sub.--chargers/CB120L.

Ryobi Product Catalog, 18 Volt High Capacity Lithium-Ion Battery, Model P104; www.ryobitools.com/catalog/accessories/batteries.sub.--chargers/P10-4.

* cited by examiner

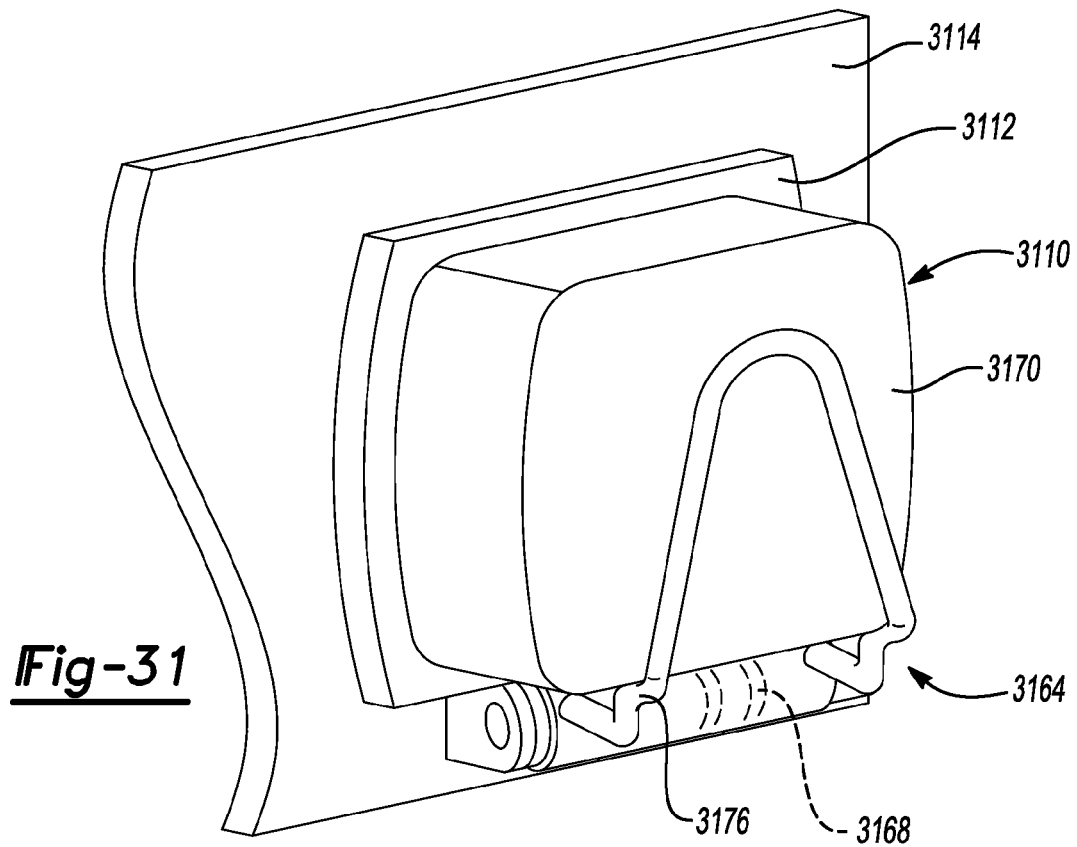
_Fig-31_
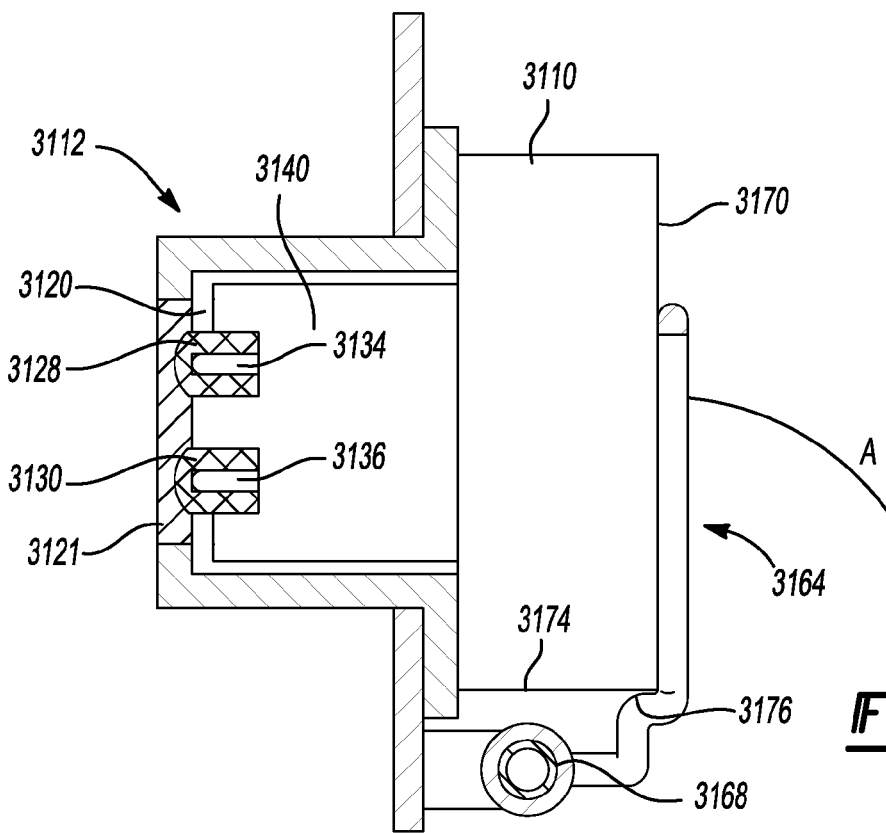
_Fig-32_

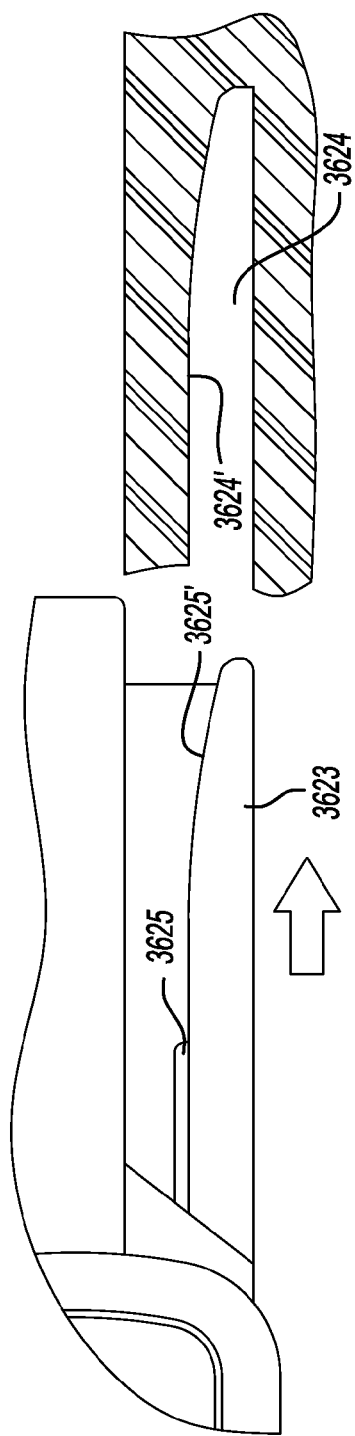
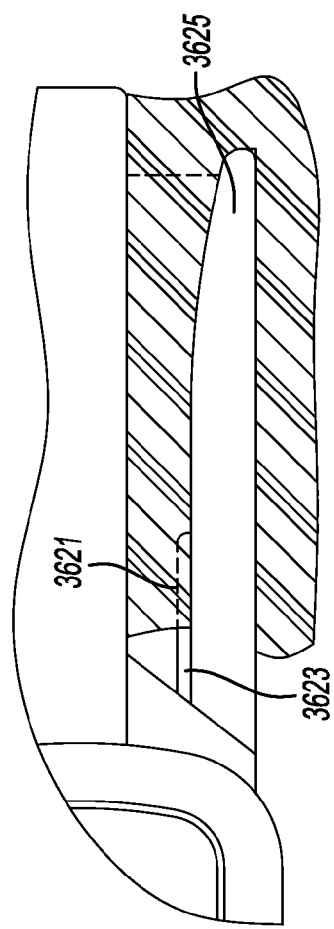
Fig-39A
Fig-39B

UNIVERSAL POWER TOOL BATTERY PACK COUPLED TO A PORTABLE INTERNAL COMBUSTION ENGINE

CROSS-REFERENCE TO RELATED APPLICATIONS

The present application is divisional of U.S. patent application Ser. No. 13/193,818, filed Jul. 29, 2011, which is a divisional of U.S. patent application Ser. No. 12/107,807 filed Apr. 23, 2008, which is a continuation-in-part of U.S. patent application Ser. No. 11/526,825 filed Sep. 25, 2006 (now U.S. Pat. No. 7,687,926, issued Mar. 30, 2010), which claims the benefit of U.S. Provisional Application No. 60/727,201 filed Oct. 14, 2005. U.S. patent application Ser. No. 11/526,825 filed Sep. 25, 2006 (now U.S. Pat. No. 7,687,926, issued Mar. 30, 2010) is a continuation-in-part of U.S. patent application Ser. No. 11/321,773 filed Dec. 29, 2005 (now U.S. Pat. No. 7,309,928, issued Dec. 18, 2007), which also claims the benefit of U.S. Provisional Application No. 60/727,201 filed Oct. 14, 2005. U.S. patent application Ser. No. 11/321,773 filed Dec. 29, 2005 (now U.S. Pat. No. 7,309,928, issued Dec. 18, 2007), is a continuation-in-part of U.S. patent application Ser. No. 10/453,988 filed Jun. 4, 2003 (now U.S. Pat. No. 7,180,200, issued Feb. 20, 2007), which claims the benefit of U.S. Provisional Application No. 60/386,904 filed Jun. 6, 2002. The disclosures of the above applications are incorporated herein by reference.

FIELD

This development relates generally to various coupling structures for coupling a removable, portable universal tool battery pack with an internal combustion (IC) engine and/or a generator. For example, a removable, portable universal battery pack can be coupled to a permanent magnet generator (PMG) to start an internal combustion (IC) engine of the generator and/or can be coupled to a generator for charging.

BACKGROUND

Present day portable generators or other devices driven by an internal combustion (IC) engine typically make use of a starter motor and a fixed lead acid battery to start the IC engine that drives an alternator, thereby producing an electrical power output. The starter motor and fixed battery add size, bulk and weight to the portable generator. As can be appreciated, since the generator is intended to be transportable, keeping the generator as light and as small as possible is highly desirable.

In the latest portable generator technology, the alternator is replaced with a smaller and lighter permanent magnet generator (PMG) and an electronic power converter. In normal operation, the IC engine directly drives the PMG which then produces electrical power. This variable frequency (engine speed dependent), variable voltage power is then converted electronically to a constant voltage, constant frequency output, for example a 120 VAC, 60 Hz output. Typically, a PMG includes a single set of windings that are used to produce the electrical power output of the portable generator.

It would be highly desirable to provide a portable IC engine that utilizes a removable/portable universal battery pack adapted for use with various other DC powered tools to start the engine, e.g., for a generator, thereby eliminating the need for the fixed lead-acid battery and making the generator lighter in weight and more manageable to maneuver.

It would further be highly desirable to provide a portable generator that utilizes such a portable universal battery pack in combination with a PMG adapted to start the IC engine. This would eliminate the need for the starter motor as well as the lead acid battery, thereby making the generator even lighter in weight and even more manageable to maneuver.

It would further be highly desirable to provide such a portable generator that can recharge such a portable universal battery pack, for example, after the portable universal battery pack is used to start the IC engine of the generator.

SUMMARY

In accordance with an aspect of the disclosure, an electromechanical device includes an internal combustion engine supported and a battery receptacle on a manually movable frame. The battery receptacle has two opposite lateral sides and includes a receptacle terminal block coupled to the internal combustion engine via a coupling mechanism. The receptacle terminal block is located adjacent a distal end of a tower receptacle and includes a positive receptacle contact associated with a first wall of the tower receptacle corresponding to one of the two opposite lateral sides and a negative receptacle contact associated with a second wall of the tower receptacle corresponding to the other of the two opposite lateral sides. The battery receptacle further includes a receptacle latch projection associated with each of the two opposite lateral sides of the battery receptacle. A battery pack for a cordless power tool has a battery terminal block associated with a distal end of a battery tower. The battery terminal block includes a positive battery contact located and configured to make electrical contact with the positive receptacle contact, and a negative battery contact located and configured to make contact with the negative receptacle contact when the battery pack is inserted into the battery receptacle. The battery pack further includes a battery latch projection associated with a manually actuatable latch and the battery latch projection located and configured to cooperate with the receptacle latch projection to latch the battery pack to the battery receptacle when the battery pack is inserted into the battery receptacle. A latch key in the form of at least one projection extends from and generally perpendicular to the battery latch projection. The receptacle latch projection is configured to accept the projection.

In another aspect, the coupling components of an electromechanical device include a battery receptacle having two opposite lateral sides, a front side, and a back side. The battery receptacle includes a receptacle terminal block coupled to the internal combustion engine via a coupling mechanism. The receptacle terminal block is associated with a distal end of a tower receptacle and includes a positive receptacle contact extending from an end wall of the tower receptacle and located adjacent a back side of the tower receptacle corresponding to the back side of the battery receptacle. The receptacle terminal block also includes a negative receptacle contact extending from an end wall of the tower receptacle and located adjacent a front side of the tower receptacle corresponding to the front side of the battery receptacle. The battery receptacle further includes a receptacle latch projection associated with each of the two opposite lateral sides of the battery receptacle. A battery pack for a cordless power tool has a battery terminal block associated with a distal end of a battery tower. The battery terminal block includes a positive battery contact located and configured to make electrical contact with the positive receptacle contact, and a negative battery contact located and configured to make contact with the negative receptacle contact when the battery pack is inserted into the battery receptacle. The battery pack further includes a battery latch projection associated with a manually actuatable latch and the battery latch projection being located and configured to cooperate with the receptacle latch projection to latch the battery pack to the battery receptacle when the battery pack is inserted into the battery receptacle. A latch key in the form of at least one projection extends from and generally perpendicular to the battery latch projection, and the receptacle latch projection is configured to accept the at least one projection.

According to another aspect, the coupling components of an electro-mechanical device includes a battery receptacle comprising a receptacle terminal block coupled to the internal combustion engine via a coupling mechanism. The receptacle terminal block is associated with a distal end of a tower receptacle and comprising a positive receptacle contact and a negative receptacle contact. A battery pack for a cordless power tool has a battery terminal block associated with a distal end of a battery tower. The battery terminal block includes a positive battery contact located and configured to make electrical contact with the positive receptacle contact, and a negative battery contact located and configured to make contact with the negative receptacle contact when the battery pack is inserted into the battery receptacle. The battery receptacle further includes a retention clip biased toward a retention position in which the retention clip exerts a biasing force on the battery pack to retain the positive and negative battery contacts in electrical communication with the corresponding positive and negative receptacle contacts. In addition, the retention clip is manually movable into an open position in which the battery tower may be removed or inserted into the tower receptacle.

According to yet another aspect, the coupling components of an electro-mechanical device include a battery receptacle having two opposite lateral sides and a receptacle terminal block coupled to the internal combustion engine via a coupling mechanism. The receptacle terminal block includes a terminal end defined by two opposite lateral side walls and a terminal face extending generally perpendicular to and between the two opposite lateral side walls. A positive receptacle contact is associated with the terminal face and adjacent one of the two opposite lateral side walls. A negative receptacle contact is associated with the terminal face and adjacent the other of the two opposite lateral side walls. A recess is provided in an offset intermediate position of the terminal face between the positive and negative receptacle contacts. The battery receptacle further includes an outwardly directed rail recess extending along each of the two opposite lateral sides. A battery pack for a cordless power tool has a battery terminal block associated with an end of a recessed area of an upper side of the battery pack. The battery terminal block includes a positive battery contact located and configured to make electrical contact with the positive receptacle contact, a negative battery contact located and configured to make electrical contact with the negative receptacle contact when the battery pack is inserted into the battery receptacle. The battery terminal block also includes a divider wall in an offset intermediate position between the positive and negative battery contacts and configured to extend into the recess when the battery pack is inserted into the battery receptacle. The battery pack further includes an inwardly directed coupling rail associated with each opposite lateral side of the recessed area. Each rail is configured to cooperate with one of the rail recesses to retain the battery pack to the battery receptacle when the battery pack is coupled to the battery receptacle.

In an aspect, the coupling components of an electro-mechanical device include a battery receptacle having two opposite lateral sides and a receptacle terminal block coupled to the internal combustion engine via a coupling mechanism. The receptacle terminal block includes a terminal end defined by two opposite lateral side walls and a terminal face extending generally perpendicular to and between the two opposite lateral side walls. A positive receptacle contact is associated with the terminal face and adjacent one of the two opposite lateral side walls. A negative receptacle contact is associated with the terminal face and adjacent the other of the two opposite lateral side walls. The battery receptacle further includes an inwardly directed rail recess extending along each of the two opposite lateral sides. A battery pack for a cordless power tool has a battery terminal block associated with an end of a recessed area of an upper side of the battery pack. The battery terminal block includes a positive battery contact located and configured to make electrical contact with the positive receptacle contact, and a negative battery contact located and configured to make electrical contact with the negative receptacle contact when the battery pack is inserted into the battery receptacle. The battery pack further includes an outwardly directed coupling rail associated with each opposite lateral side of the recessed area and each rail being configured to cooperate with one of the rail recesses to retain the battery pack to the battery receptacle when the battery pack is coupled to the battery receptacle.

In a further aspect, the coupling components of an electro-mechanical device include a battery receptacle including an upwardly facing recess formed by two opposite lateral side walls and two end walls extending upwardly. A receptacle terminal block is supported by one of the end walls and coupled to the internal combustion engine via a coupling mechanism. The receptacle terminal block includes a terminal end defined by two opposite lateral side walls and a terminal face extending generally perpendicular to and between the two opposite lateral side walls. A positive receptacle contact is associated with the terminal face and adjacent one of the two opposite lateral side walls. A negative receptacle contact is associated with the terminal face and adjacent the other of the two opposite lateral side walls. A battery pack for a cordless power tool has a battery terminal block associated with an end of a recessed area of an upper side of the battery pack. The battery terminal block comprising a positive battery contact located and configured to make electrical contact with the positive receptacle contact, and a negative battery contact located and configured to make electrical contact with the negative receptacle contact when the battery pack is inserted into the battery receptacle.

In accordance with an additional aspect, the coupling components of an electro-mechanical device include a battery receptacle including a receptacle terminal block coupled to the internal combustion engine via a coupling mechanism. The receptacle terminal block includes a terminal end defined by two opposite lateral side walls and a terminal face extending generally perpendicular to and between the two opposite lateral side walls. A positive receptacle contact is associated with the terminal face and adjacent one of the two opposite lateral side walls. A negative receptacle contact is associated with the terminal face and adjacent the other of the two opposite lateral side walls. A battery pack for a cordless power tool has a battery terminal block associated with an end of a recessed area of an upper side of the battery pack. The battery terminal block includes a positive battery contact located and configured to make electrical contact with the positive receptacle contact, and a negative battery contact located and configured to make electrical contact with the negative receptacle contact when the battery pack is inserted into the battery receptacle. The battery receptacle further includes a movable retention clip biased toward a retention position in which the retention clip exerts a biasing force on the battery pack to retain the positive and negative battery contacts in electrical communication with the corresponding positive and negative receptacle contacts. The retention clip is also manually movable into an open position in which the battery pack may be uncoupled from the battery receptacle.

In accordance with another aspect, the coupling components of an electro-mechanical device include a battery receptacle including a receptacle terminal block coupled to the internal combustion engine via a coupling mechanism. The receptacle terminal block includes a terminal end defined by two opposite lateral side walls and a terminal face extending generally perpendicular to and between the two opposite lateral side walls. A positive receptacle contact is associated with the terminal face and adjacent one of the two opposite lateral side walls. A negative receptacle contact is associated with the terminal face and adjacent the other of the two opposite lateral side walls. A battery pack for a cordless power tool has a battery terminal block associated with an end of a recessed area of an upper side of the battery pack. The battery terminal block includes a positive battery contact located and configured to make electrical contact with the positive receptacle contact, and a negative battery contact located and configured to make electrical contact with the negative receptacle contact when the battery pack is inserted into the battery receptacle. The battery receptacle further includes a resilient clip having an empty position in which the resilient clip is in a relaxed state when the battery is removed from the battery receptacle. The resilient clip is movable into a flexed position in which the resilient clip exerts a biasing force on the battery pack when the positive and negative battery contacts are in electrical communication with the corresponding positive and negative receptacle contacts.

In accordance with even another aspect, the coupling components of an electro-mechanical device include at least one receptacle terminal block associated with the manually movable frame via a cord. Each receptacle terminal block is coupled to the internal combustion engine via a coupling mechanism. Each receptacle terminal block includes a terminal end defined by two opposite lateral side walls and a terminal face extending generally perpendicular to and between the two opposite lateral side walls. A positive receptacle contact is associated with each terminal face and adjacent one of the two opposite lateral side walls. A negative receptacle contact is associated with each terminal face and adjacent the other of the two opposite lateral side walls. A battery pack for a cordless power tool has a battery terminal block associated with an end of a recessed area of an upper side of the battery pack. The battery terminal block includes a positive battery contact located and configured to make electrical contact with the positive receptacle contact, and a negative battery contact located and configured to make electrical contact with the negative receptacle contact when the battery pack is inserted into the battery receptacle.

The coupling mechanism identified above can be a starting circuit electrically coupling the positive and negative contacts to a starting device during a starting operation. In this case, the starting device is coupled to the internal combustion engine and configured to start the internal combustion engine using electrical power provided by the cordless power tool battery pack during the starting operation. Alternatively, the coupling mechanism can be a charging circuit electrically coupling the positive and negative contacts to a charging device during a charging operation. In this case, the charging device is coupled to the internal combustion engine and configured to charge the cordless power tool battery pack during the charging operation. As another alternative, the coupling mechanism can include the starting circuit and the charging circuit.

In other aspects, the portable power driven system may include an air compressor and a power washer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 31 is a partial perspective view of a battery pack inserted into another battery receptacle embodiment;

FIG. 32 is a partial cross-sectional view of the battery pack inserted into the battery receptacle of FIG. 31;

FIGS. 39A and 39B are enlarged, partial cross-section views of the cooperating rails of the battery pack and battery receptacle of FIGS. 36-38;

DETAILED DESCRIPTION OF THE PREFERRED EMBODIMENTS

The following description of the preferred embodiment(s) is merely exemplary in nature and is in no way intended to limit the invention, its application or uses.

Figure 1:
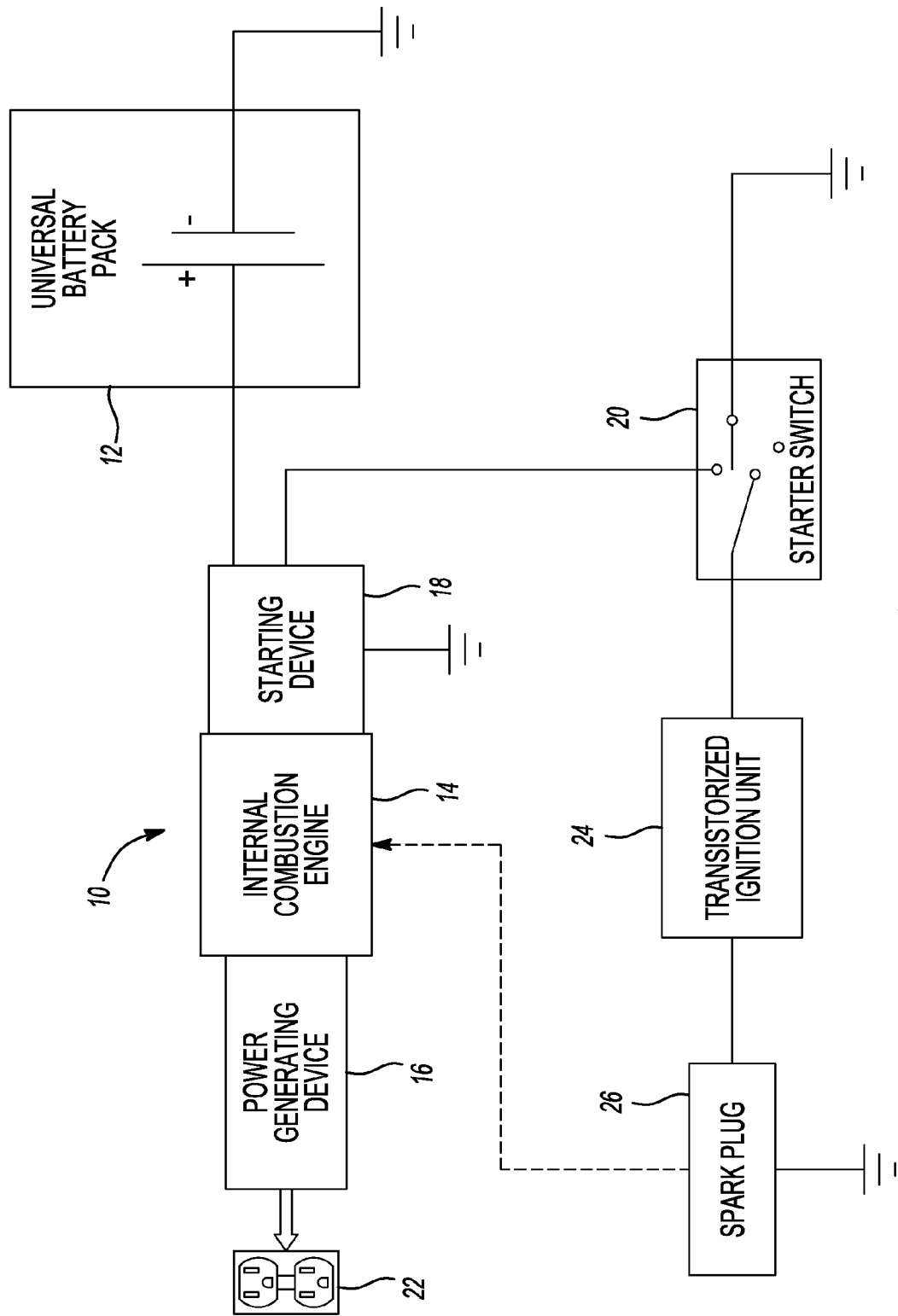
FIG. 1 is a simplified block diagram of a portable generator system, in accordance with an embodiment of the present invention, wherein the system utilizes a portable universal battery pack to start an internal combustion (IC) engine of the generator system.

FIG. 1 is a simplified block diagram of a portable generator system 10, in accordance with an embodiment of the present invention. The generator system 10 utilizes a portable universal battery pack 12 to start an internal combustion (IC) engine 14 that turns a power generating device 16. System 10 additionally includes a starting device 18 connected to universal battery pack 12 and a starter switch 20. Starter switch 20 is connected to a transistorized ignition unit 24, which is in turn connected to a spark plug 26. Starting device 18 is used to turn IC engine 14 at a rate sufficient to start IC engine 14. Once IC engine 14 is started, IC engine 14 drives power generating device 16, whereby power generating device 16 outputs AC power usable by a load connected to an electrical outlet 22.

Figure 2:
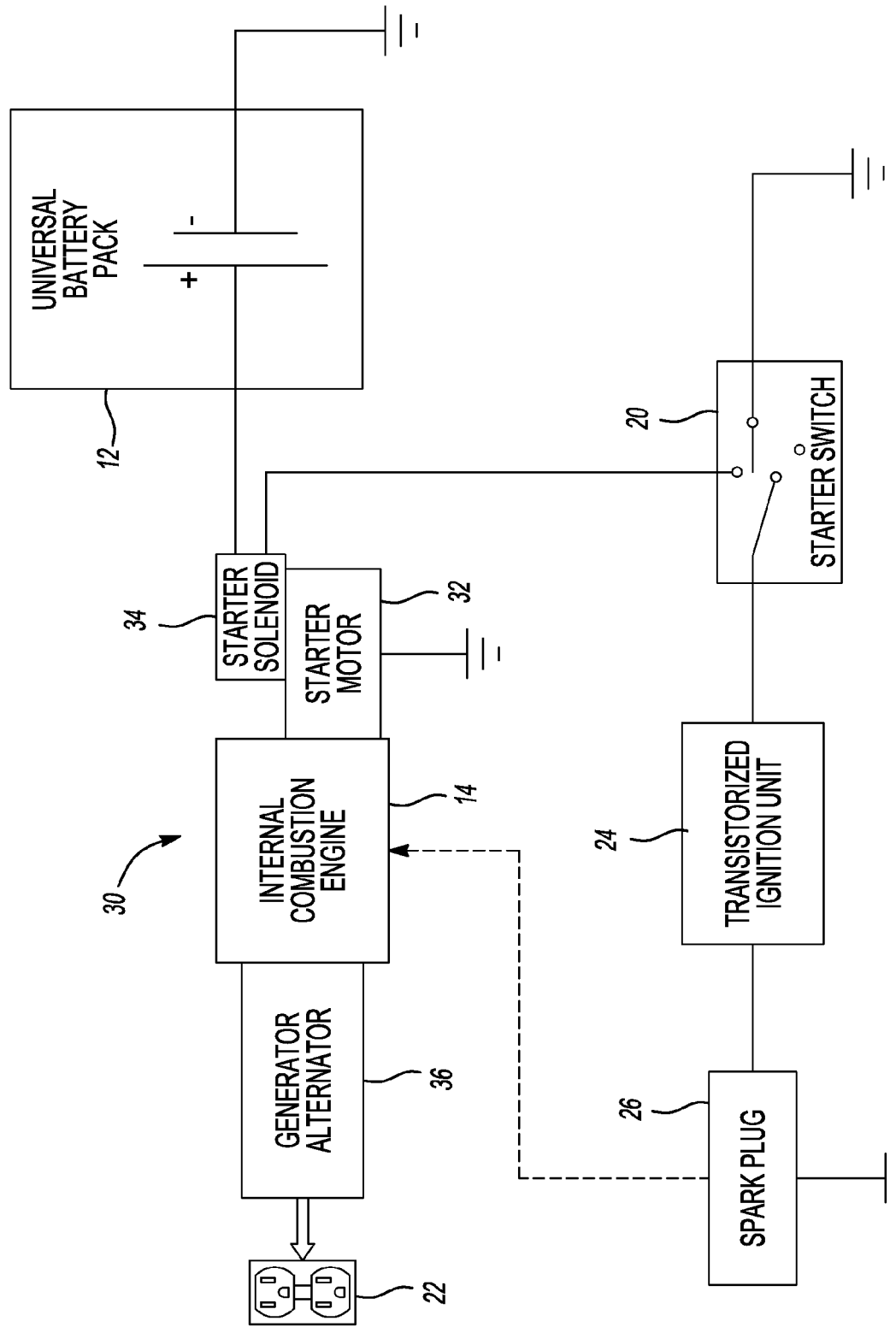
FIG. 2 is a simplified block diagram of an alternate embodiment of the portable generator system shown in FIG. 1.

FIG. 2 is a simplified block diagram of a portable generator system 30, which is an alternate embodiment of portable generator system 10 (shown in FIG. 1). In this embodiment, starting device 18 comprises a starter motor 32 and a starter solenoid 34. Additionally, power generating device 16 is an alternator 36. System 30 utilizes portable universal battery pack 12 to start IC engine 14 that turns alternator 36. Starter solenoid 34 is connected to battery pack 12 and used to initially turn starter motor 32. Starter solenoid 34 is also connected to starter switch 20. Starter switch 20 has a 'Start' position, an 'On' position and an 'Off' position. When starter switch 20 is placed in the 'Start' position, universal battery pack 12 provides low current power to starter solenoid 34.

Providing low current to starter solenoid 34 turns on starter motor 32, thereby turning IC engine 14. Starter switch 20 is spring-loaded so that it returns to the 'ON' position upon successfully starting IC engine 14. In the 'ON' position starter switch 20 directs power from ignition unit 24 to spark plug 26. Each time spark plug 26 fires, spark is provided to IC engine 14, which is utilized to ignite a compressed fuel and air mixture present in a cylinder (not shown) during a compression cycle of IC engine 14. When IC engine 14 is running it turns alternator 36, which creates an output voltage usable to provide AC power at outlet 22.

Figure 3:
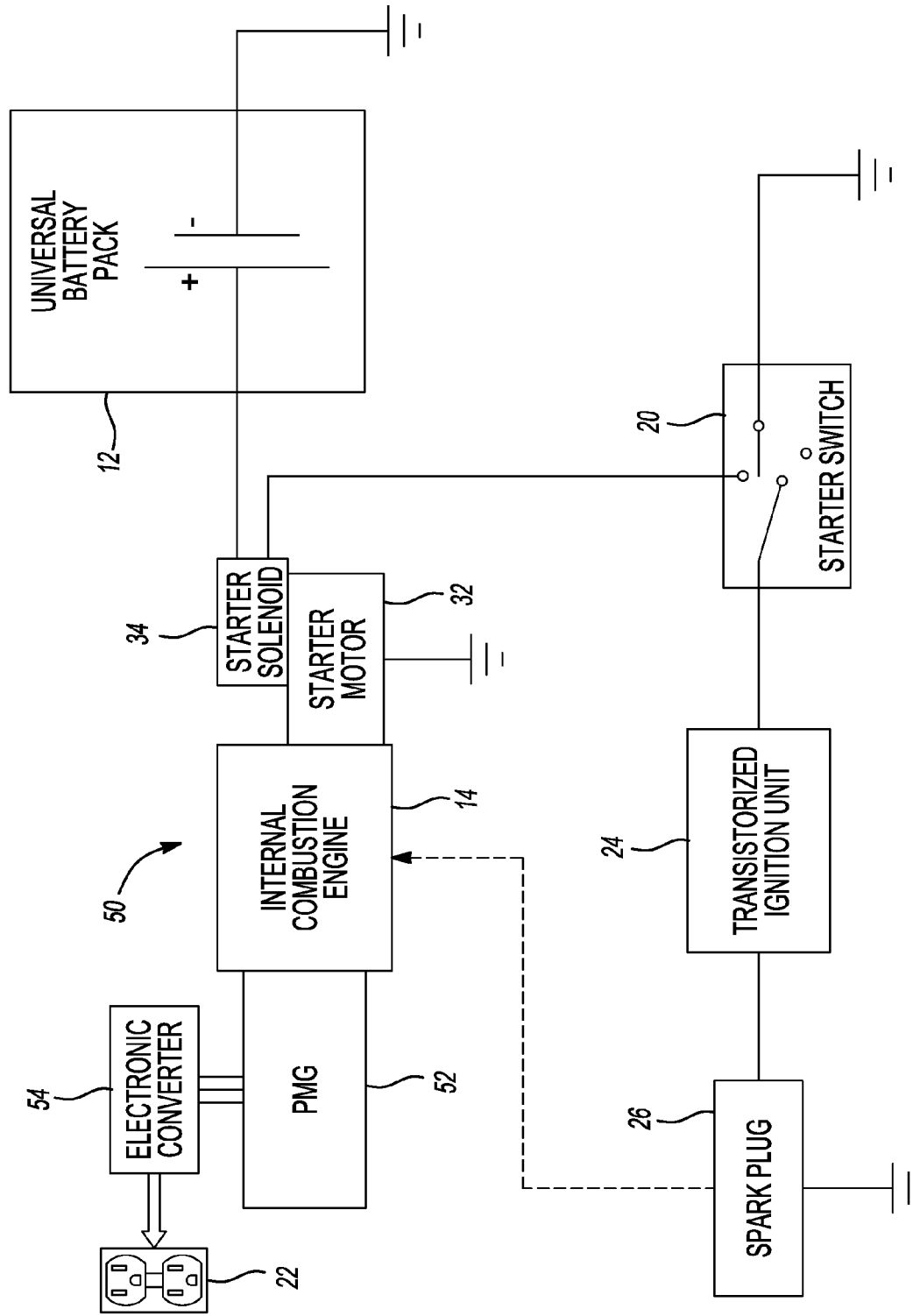
FIG. 3 is a simplified block diagram of another alternate embodiment of the portable generator system shown in FIG. 1 that utilizes a permanent magnet generator and electric converter to generate power.

FIG. 3 is a simplified block diagram of a portable generator system 50, which is an alternate embodiment of portable generator system 30 (shown in FIG. 1). In this embodiment, starting device 18 again comprises starter motor 32 and starter solenoid 34, while power generating device 16 comprises a permanent magnet generator (PMG) 52 and an electronic converter circuit 54. Generator system 50 utilizes portable universal battery pack 12 to start IC engine 14 that turns PMG 52, which is connected to electronic converter circuit 54. As described above in reference to FIG. 2, starter switch 20 has a 'Start' position, an 'On' position and an 'Off' position. When starter switch 20 is placed in the 'START' position, universal battery pack 12 provides low current power to starter solenoid 34 to start IC engine 14 as described above.

When IC engine 14 is running it turns PMG 52, which creates a 3-phase output. The 3-phase output is converted by the electronic converter circuit 54 to usable AC power that is provided to outlet 22. The electronic converter circuit 54 can be any suitable inverter circuit, such as the inverter circuit described in patent application Ser. No. 10/077,219, filed Feb. 15, 2002, entitled Alternator/Inverter With Dual H-Bridge, herein incorporated by reference in its entirety.

Figure 4:
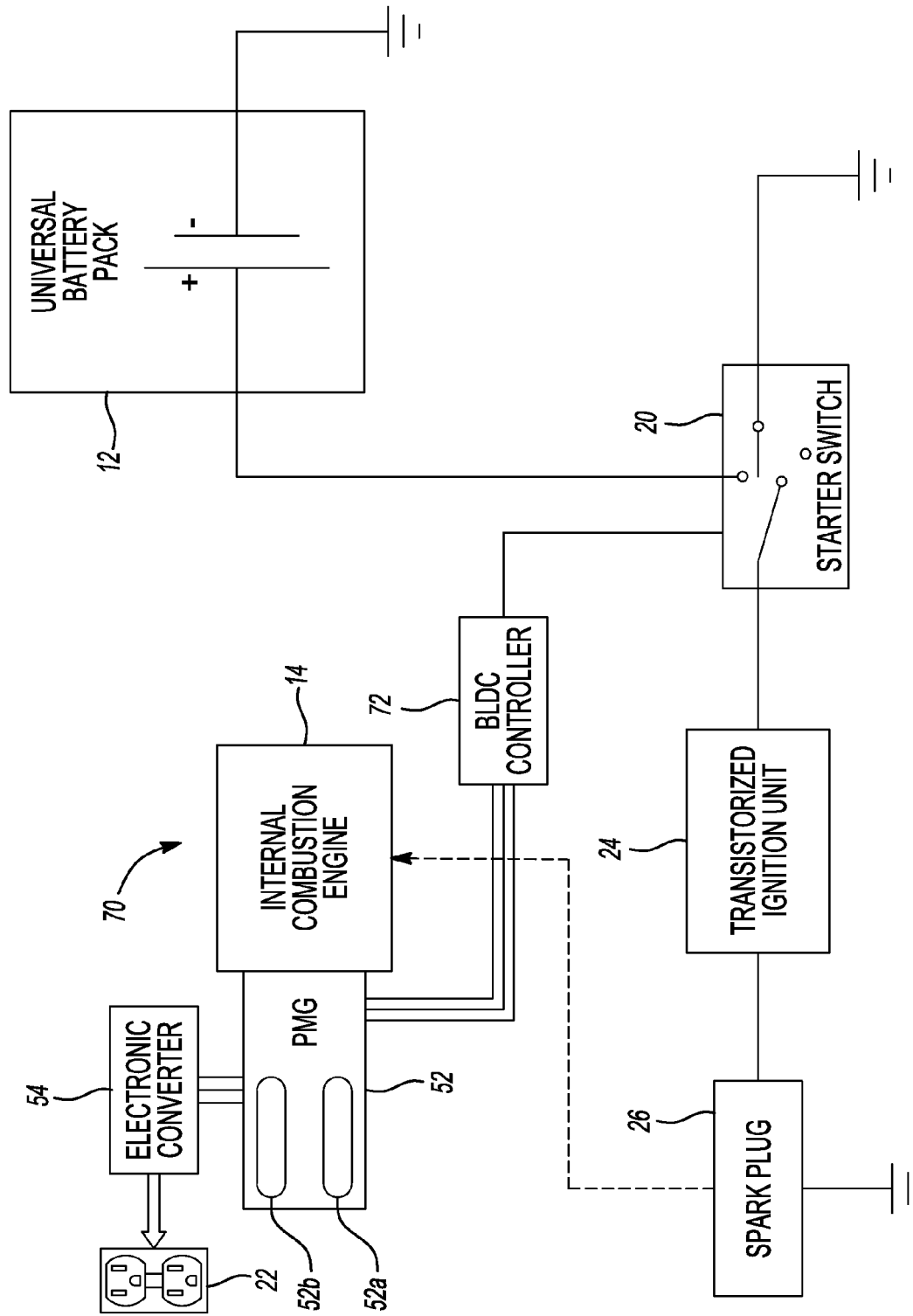
FIG. 4 is a simplified block diagram of yet another alternate embodiment of the portable generator system shown in FIG. 1 that utilizes a permanent magnet generator to start the IC engine.

FIG. 4 is a simplified block diagram of a portable generator system 70, which is yet another alternate embodiment of portable generator system 10 (shown in FIG. 1). In this embodiment, power generating device 16 again comprises PMG 52 and electronic converter circuit 54. Additionally, starting device 18 also comprises PMG 52. PMG 52 includes two sets of 3-phase windings, referred to herein as first windings 52a and second windings 52b. First and second windings 52a and 52b enable PMG 52 to be used as a starter motor for starting IC engine 14, i.e. 'Motor Mode', and a generator for generating AC power output to outlet 22, i.e. 'Generator Mode'. One set of first and second windings 52a, 52b is used to drive PMG 52 as an electric motor when PMG 52 is in the 'Motor Mode' and the other set of first and second windings 52a, 52b is used to generate power when PMG 52 is in the 'Generator Mode.'

Generator system 70 utilizes PMG 52 to start IC engine 14 and to generate AC power. Universal battery pack 12 is connected to PMG 52 via a brushless DC (BLDC) controller 72 and the starter switch 20. When PMG 52 is used in the 'Starter Mode', starter switch 20 is placed in the 'Start' position. Battery pack 12 then provides power to PMG 52, via BLDC controller 72, to drive PMG 52 as a brushless DC motor so that PMG 52 turns IC engine 14. As IC engine 14 turns, ignition unit 24 fires spark plug 26 at predetermined intervals. Each time spark plug 26 fires, spark is provided to IC engine 14. The spark is utilized to ignite the compressed fuel and air mixture present in the cylinder during the compression cycle of IC engine 14. Once the IC engine 14 is started, starter switch 20 is placed back to the 'On' position and IC engine 14 continues running. PMG 52 then stops functioning as a starter motor and switches to the 'Generator Mode'. Thus, PMG 52 begins to function as a generator. As described above in reference to FIG. 3 PMG 52 creates a 3-phase output that is converted by the electronic converter circuit 54 to usable AC power that is provided to outlet 22.

Figure 5:
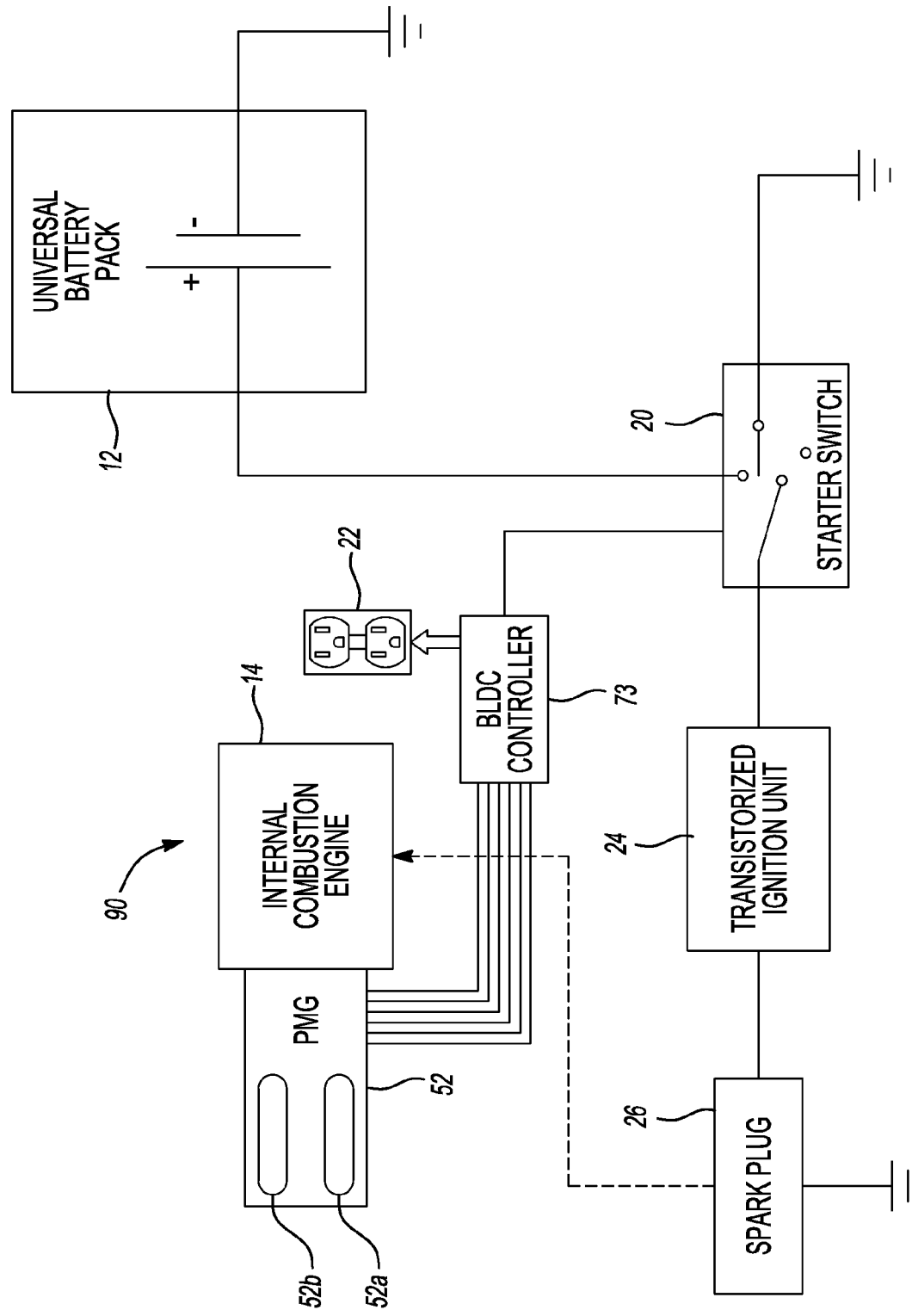
FIG. 5 is a simplified block diagram of still yet another alternate embodiment of the portable generator system shown in FIG. 1, that utilize the permanent magnet generator to start the IC engine.

FIG. 5 is a simplified block diagram of a portable generator system 90, which is still yet another alternate embodiment of portable generator system 10 (shown in FIG. 1). As in system 70, shown in FIG. 4, PMG 52 is used in the 'Motor Mode' to start IC engine 14 and used in the 'Generator Mode' to provide power to outlet 22. However, in this embodiment, the variable voltage, variable frequency power output by PMG 52 is converted to usable AC power, i.e., constant voltage, constant frequency AC power, utilizing BLDC controller 73.

Generator system 90 utilizes PMG 52 to start IC engine 14 and to generate AC power. As described above in reference to FIG. 4, universal battery pack 12 provides power to PMG 52, via BLDC controller 73, such that PMG 52 starts IC engine 14. Once the IC engine 14 is started, starter switch 20 is placed back to the 'On' position and IC engine 14 continues running. PMG 52 then stops functioning as a starter motor and switches to the 'Generator Mode' to provide power to outlet 22. More specifically, PMG 52 creates a 3-phase output. The 3-phase output is converted to AC power by a controlled full wave bridge rectifier circuit and H-bridge bridge circuit included in BLDC controller 73.

Figure 6:
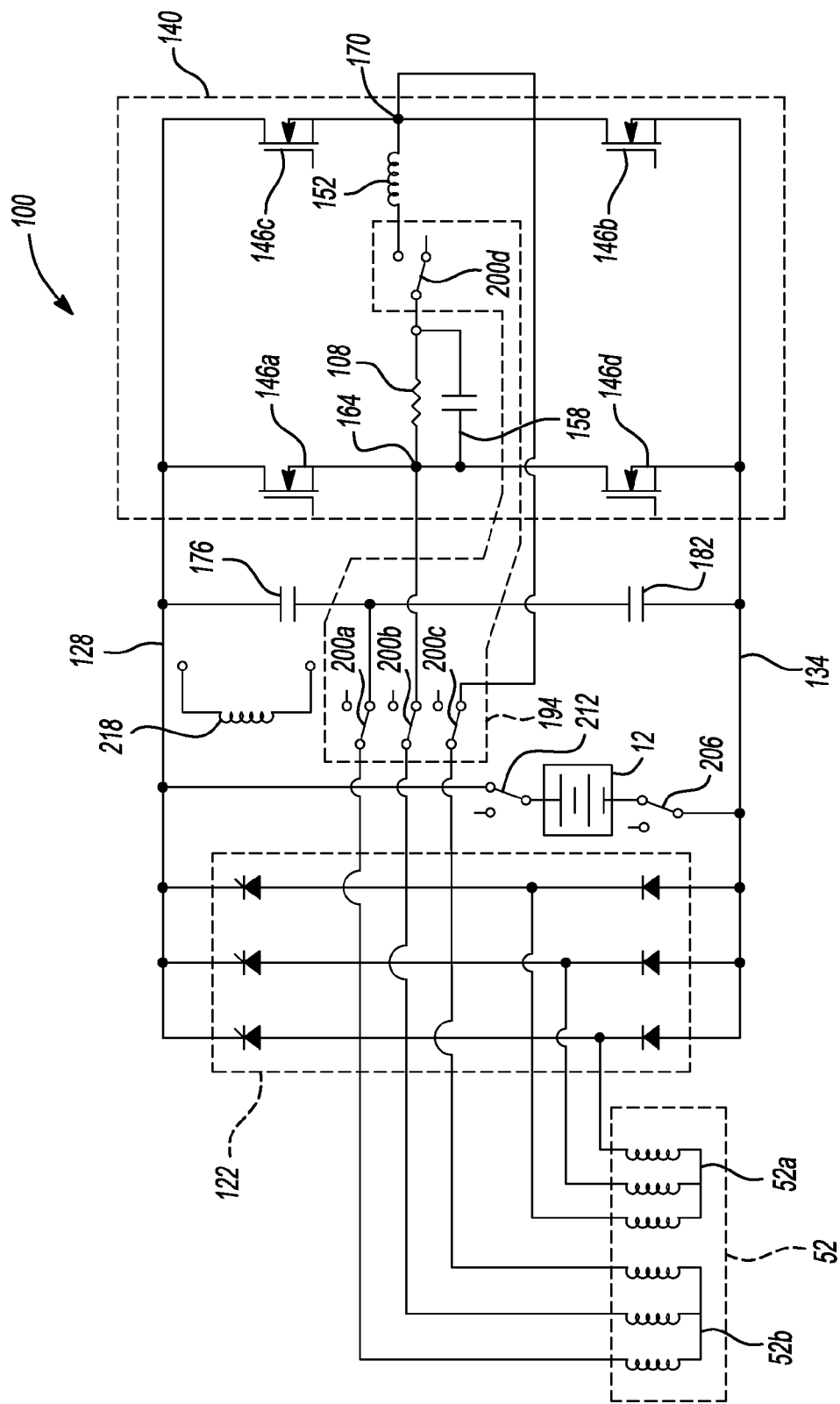
FIG. 6 is a simplified schematic drawing of an embodiment of a brushless DC drive circuit used in the portable generator system shown in FIG. 5.

FIG. 6 is an embodiment of a brushless DC drive circuit 100 included in BLDC controller 73 (FIG. 5). Circuit 100 is ideally suited for use in a portable electric power generator, however, it will be appreciated that the invention is not so limited and may find utility in a variety of related power generating applications.

Circuit 100 is electrically connected to PMG 52 (shown in FIG. 5) which is a three phase permanent magnet generator having first 3-phase windings 52a for running PMG 52 in the 'Generator Mode' and second 3-phase windings 52b for running PMG 52 in the 'Motor Mode'. In 'Generator Mode', PMG 52 outputs electrical power, such as to a load 108, while in 'Motor Mode' PMG 52 rotates IC engine 14 (shown in FIG. 5).

In 'Generator Mode', PMG 52 provides a three phase AC output signal to a controlled full wave bridge rectifier circuit 122. Rectifier circuit 122 is coupled across DC bus lines, or rails, 128 and 134 that form a DC bus. Also coupled across the DC bus is a full H-bridge circuit 140 comprising four identical power switching devices 146a-146d. An inductor 152 and a capacitor 158 are coupled across nodes 164 and 170 and form an LC filter for attenuating harmonic distortion in the output waveform generated by the H-bridge 140. Each of the power switching devices 146a-146d may comprise a variety of suitable power switching components, for example field effect transistors (FET's) or insulated gate bi-polar transistors (IGBT's). A pair of DC bus capacitors 176 and 182 are also coupled in series across the DC bus rails 128 and 134. Although the DC bus capacitance is shown to only include the pair of capacitors 176 and 182, it is envisioned that the DC bus capacitance could comprise any even number of capacitors. One phase of second windings 52b is connected at a center node between even numbers of the DC bus capacitors.

Load 108 is coupled in parallel across capacitor 158. Additionally, DC drive circuit 100 includes a 4-pole relay switch 194 that includes four poles 200a-200d and a coil 218. Universal battery pack 12 is removably inserted in series with key switches 206 and 212 between DC bus lines 128 and 134.

In starting operation, with 4-pole, double throw switch 194 de-energized, as shown, load 108 is disconnected and the three phases of second windings 52b are connected to center nodes 164 and 170 of H-bridge 140 and a center node 224 of the DC bus capacitance. With key switches 206 and 212 turned to a 'Start' position, portable universal battery pack 12 is connected across DC bus rails 128 and 134 and power switching devices 146a-146d are sequenced to run PMG 52 in the 'Motor Mode'. In this mode PMG 52 acts as a motor to turn IC engine 14. The power switching devices 146a-146d are sequenced by signals from a Hall effect position sensor (not shown) and coupled, via an AND gate (not shown), with a pulse width modulated (PWM) signal. Power switching devices 146a-146d create two phases of a three phase drive signal used to drive PMG 52 as a brushless DC motor with capacitors 176, 182 creating the third phase.

The PWM signal is based on the rated voltage output of universal battery pack 12. Thus, the rated voltage output of universal battery pack 12 need not conform to one predetermined DC voltage. The rated voltage output of universal battery pack 12 can be, for example, a voltage preferably of 12 volts or greater, preferably ranging from 12 to 18 volts. For example, a NiCd universal battery pack of 12, 14.4 or 18 volts can be utilized with circuit 100 and regardless of the output voltage, the effective voltage provided to PMG second windings 52b will be approximately equal to that of a 12 volt battery.

When the DC bus voltage exceeds the initial voltage of universal battery pack 12, for example 20 volts or greater, relay coil 218 is energized to disconnect second windings 52b from H-bridge circuit 140 and bus capacitors 176 and 182 and to connect load 108 to the output of H-bridge circuit 140. Once second windings 52b are disconnected from H-bridge circuit 140, PMG 52 is switched to 'Generator Mode'. In 'Generator Mode', PMG 52 outputs variable voltage, variable frequency AC power, via first windings 52a. Full wave bridge rectifier circuit 122 and H-bridge circuit 140 convert the AC power to a constant voltage, constant frequency output, for example a 120 VAC, 60 Hz, that is output from H-bridge circuit 140 to load 108.

Utilizing universal battery pack 12 and PMG 52 to provide starting power to IC engine 14 greatly reduces the size and weight of generator system 90. It is envisioned that universal battery pack 12 can be any universal battery pack commonly used in many cordless power tools, for example the DEWALT XR PLUS (Extended Run Time Plus) line of batteries.

Figure 7:
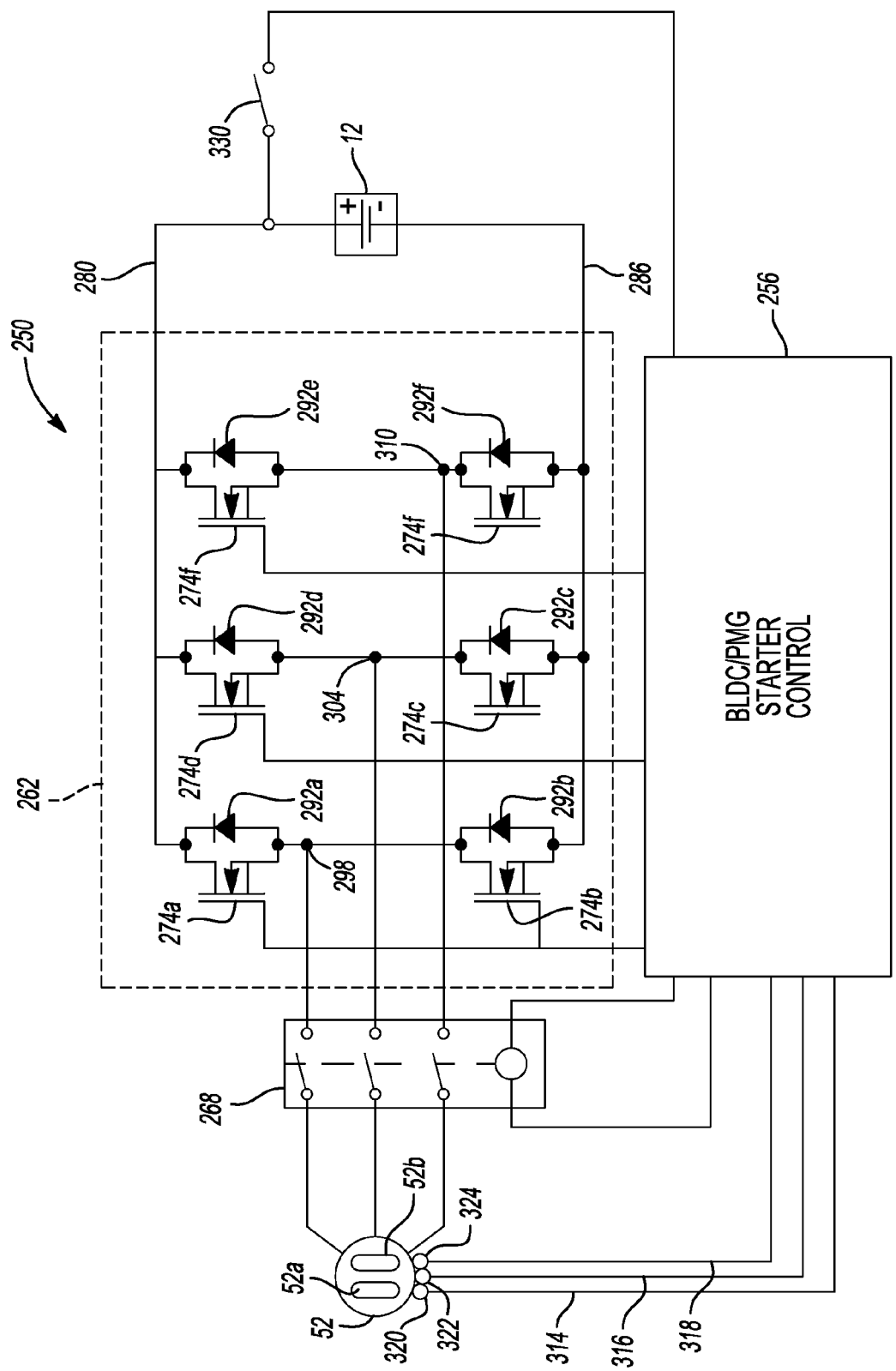
FIG. 7 is a simplified schematic drawing of another embodiment of a brushless DC drive circuit used in the portable generator system shown in FIG. 4.

FIG. 7 is a simplified schematic drawing of a preferred embodiment of a brushless DC motor drive circuit 250 included in BLDC controller 72 used in portable generator system 70 (shown in FIG. 4). Drive circuit 250 is used to drive PMG 52 as a brushless DC motor to start IC engine 14 (shown in FIG. 4). Circuit 250 is a low voltage DC to AC 3-phase inverter that incorporates a Brushless DC/Permanent Magnet Generator (BLDC/PMG) starter control 256, and is powered directly by universal battery pack 12. DC drive circuit 250 includes a power stage 262 that is electrically connectable to PMG 52 through a 3-pole relay switch 268. Power stage 262 includes six identical power switching devices 274a-274f coupled across DC bus lines, or rails, 280 and 286.

Power switching devices 274a and 274b are connected in series between bus lines 280 and 286 having a center node 298 electrically connected to one pole of relay 268. Power switching devices 274c and 274d are connected in series between bus lines 280 and 286 having a center node 304 electrically connected to a second pole of relay 268. Power switching devices 274e and 274f are similarly connected in series between bus lines 280 and 286 having a center node 310 electrically connected to a third pole of relay 268. Six diodes 292a-292f are respectively connected in parallel with switching devices 274a-274f, between bus lines 280 and 286. Switching devices 274a-274f may comprise a variety of suitable power switching components, for example field effect transistors (FET's), insulated gate bi-polar transistors (IGBT's), or metal oxide silicon field effect transistors (MOSFET's).

The 3-phase PMG 52 includes position sensors 320, 322 and 324, which are illustratively Hall effect sensors, that are connected to BLDC/PMG starter control 256 by lines 314, 316 and 318, respectively. Position sensors 320, 322, 324 sense the position of a rotor (not shown) of PMG 52. Additionally, DC drive circuit 250 includes a momentary starter switch 330 that controls the flow of current from universal battery pack 12 to BLDC/PMG starter control 256.

In operation, initially IC engine 14 is at rest. The IC engine 14 is started by a user closing momentary start switch 330. The BLDC/PMG starter control 256 will then become energized by universal battery pack 12. Provided the position sensors 320, 322 and 324 indicate that either the speed of IC engine 14 or the speed of PMG 52 is less than a predetermined value, e.g. 600 rpm, 3-pole relay switch 268 will be energized by BLDC/PMG starter control 256, thereby connecting the 3-phase power stage 262 to PMG 52. Utilizing information from position sensors 320, 322 and 324, the switching devices 274a-274f are turned on and off by BLDC/PMG starter control 256. The switching of switching devices 274a-274f electronically commutates second 3-phase windings 52b within PMG 52 to drive PMG 52 as a brushless DC motor to rotate IC engine 14 to start it.

Thus, when PMG 52 is in 'Motor Mode', IC engine 14 will be turned by PMG 52 acting as a motor and will accelerate up to a speed to start IC engine 14. Once IC engine 14 has started, PMG 52 is driven past a predetermined maximum speed, e.g. 600 rpm, and 3-pole relay switch 268 will then be de-energized, thereby disconnecting power stage 262 from PMG 52. Disconnecting power stage 262 avoids overdriving universal battery pack 12 and supplying excessive voltage to switching devices 274a-274f. Once the starting operation is complete, momentary starter switch 330 is opened.

BLDC/PMG starter control 256 can be microprocessor based to simplify the electronic circuitry and to provide additional control features. Additional control features may include setting a maximum cranking time, e.g. 5 seconds, to avoid damage if momentary starter switch 330 is held closed for too long, or not attempting starting of IC engine 14 when universal battery pack 12 does not have sufficient voltage to turn or start IC engine 14. Further control features provided by a microprocessor based BLDC/PMG starter control 256 may include speed detection and control of 3-pole relay switch 268 to avoid overdriving universal battery pack 12 and power stage 262. Even further control features may include setting an upper starting speed of PMG 52 regardless of the voltage of universal battery pack 12 by utilizing pulse width modulation control of switching devices 274a-274f above a minimum speed.

In an alternate embodiment, PMG 52 includes a single set of tapped windings. In this embodiment, the first windings 52a comprise the full windings, which are used to generate AC power in the 'Generator Mode'. The second windings 52b comprise the tapped portion of the windings, which are used to drive PMG 52 as a motor in the 'Motor Mode' to start the IC engine 14.

Although the present invention has been shown and described in connection with a portable generator using a single PMG and a single alternator/inverter circuit, or a single brushless DC drive circuit, the present invention could just as readily be adapted for use with starter systems of portable generators utilizing a pair of PMG's and a pair of alternator/inverter circuits. Alternatively, the present invention could be used with a portable generator using a pair of PMG's with a pair of brushless DC motor drive circuits, such as that described in patent application Ser. No. 10/077,386, filed Feb. 15, 2002, entitled Alternator/Inverter With Dual H-Bridge and Automatic Voltage Regulation, herein incorporated by reference in its entirety. The invention is further applicable to all types of small IC engines, for example a lawnmower engine. Thus, the scope of the invention should not be construed as being limited only to portable generators.

The present invention thus provides a means for starting an internal combustion engine utilizing a universal battery pack, wherein the universal batter pack is able to be used with other cordless power tools. Also, by controlling an H-Bridge switching circuit in a predetermined switching sequence, the H-Bridge can be used to control the application of power to a PMG to enable the PMG to be effectively used as a starter motor to start the internal combustion engine.

Figure 8:
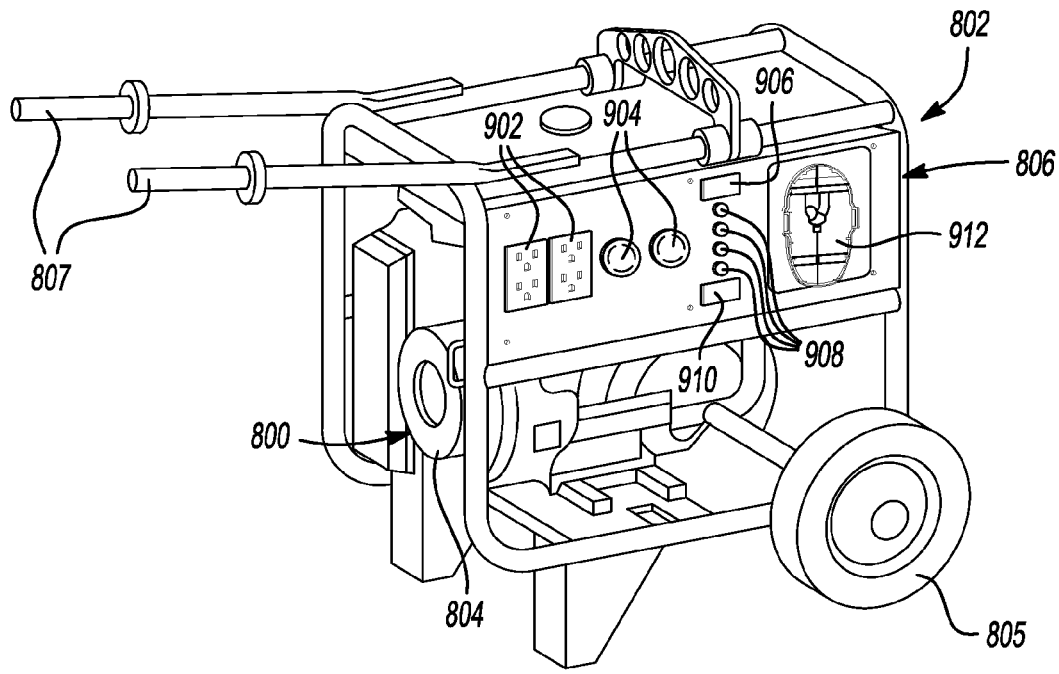
FIG. 8 is a side perspective view of a portable generator in accordance with an aspect of the invention.

FIG. 8 shows a portable generator 800 in accordance with an aspect of the invention. As used herein, a portable generator has an electric generator device for generating AC power that is driven by an internal combustion engine and is sufficiently light that it can be manually moved from one place to another. Portable generator 800 includes a frame 802 that supports an internal combustion engine 804. Frame 802 may illustratively support wheels 805 (only one of which is shown in FIG. 8) and include handles 807 to facilitate manually moving portable generator 800. An electric generator device (hidden from view in FIG. 8) is coupled to an output shaft of internal combustion engine 804. The electric generator device generates AC power, such as has been described above. The AC power may illustratively be 120 VAC (or 110 or 115 VAC) and may also illustratively be 240 VAC (or 220 or 230 VAC). It may be 60 Hz, or may be 50 Hz.

Figure 9:
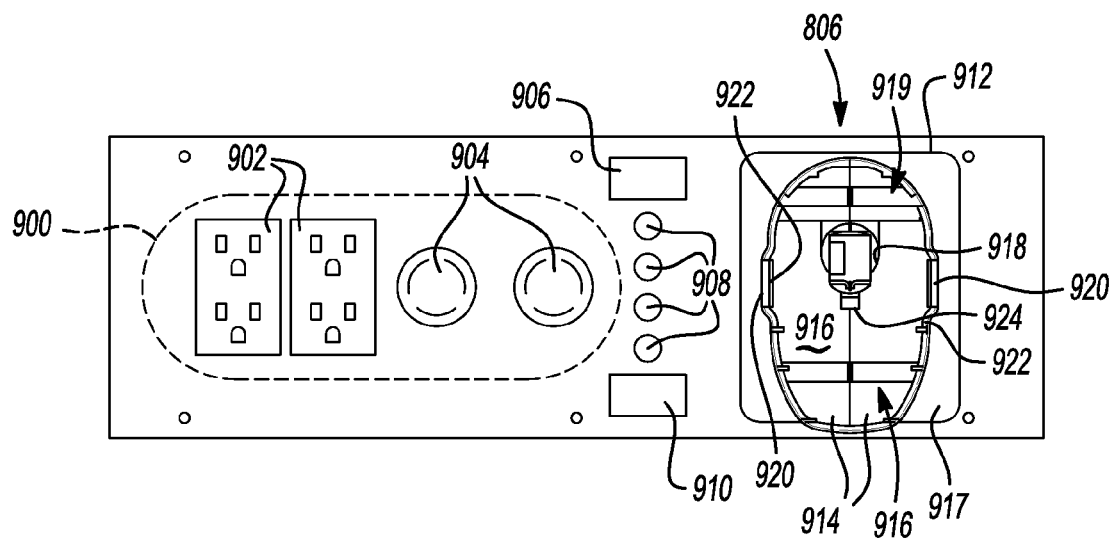
FIG. 9 is a front view of a control panel of the portable generator of FIG. 8.
Figure 10:
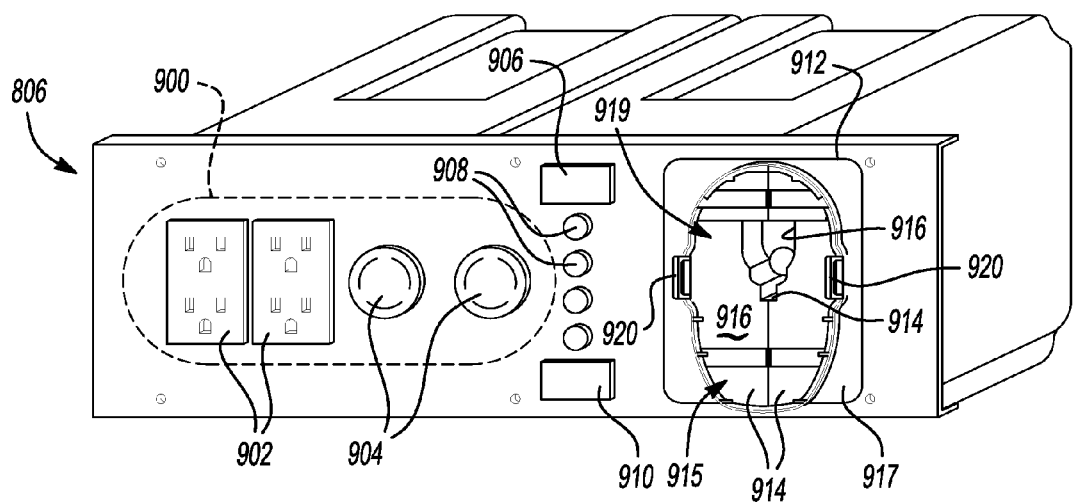
FIG. 10 is a front perspective view of the control panel of FIG. 9.

Portable generator 800 further includes a control panel 806, shown in more detail in FIGS. 9 and 10. Referring to FIGS. 9 and 10, control panel 806 includes AC outlets 900. AC outlets 900 illustratively include ground fault interrupter outlets 902 and twist-lock outlets 904. Control panel 806 also includes on/off/start switch 906, circuit breakers 908, and idle speed control switch 910. Control panel 806 further includes battery receptacle 912 electrically coupled to an electrically powered starting device for starting internal combustion engine 804, such as the starting devices described above.

Figure 11:
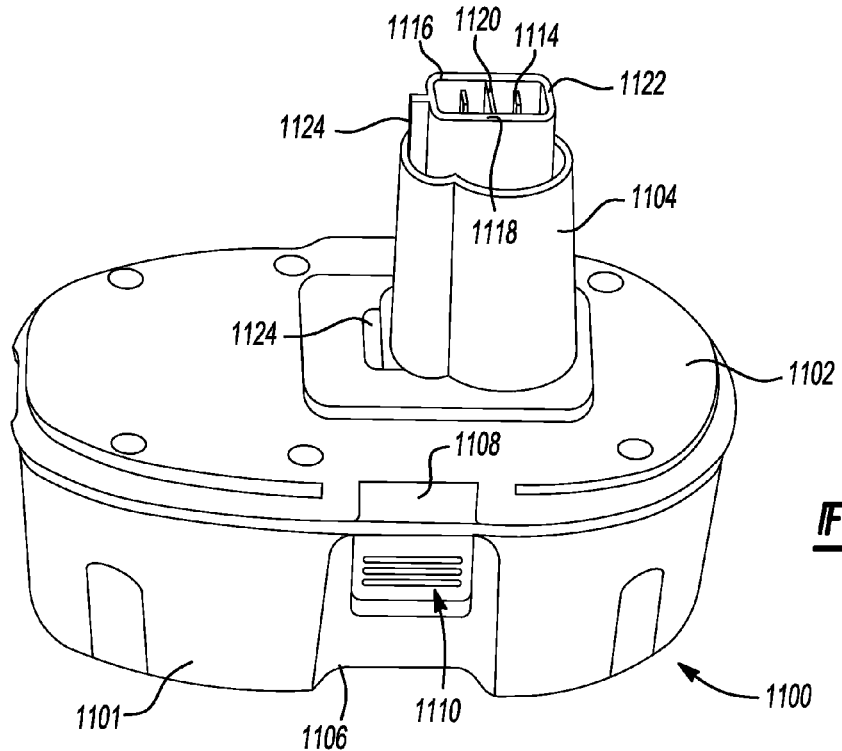
FIG. 11 is a side perspective view of a battery pack.
Figure 15:
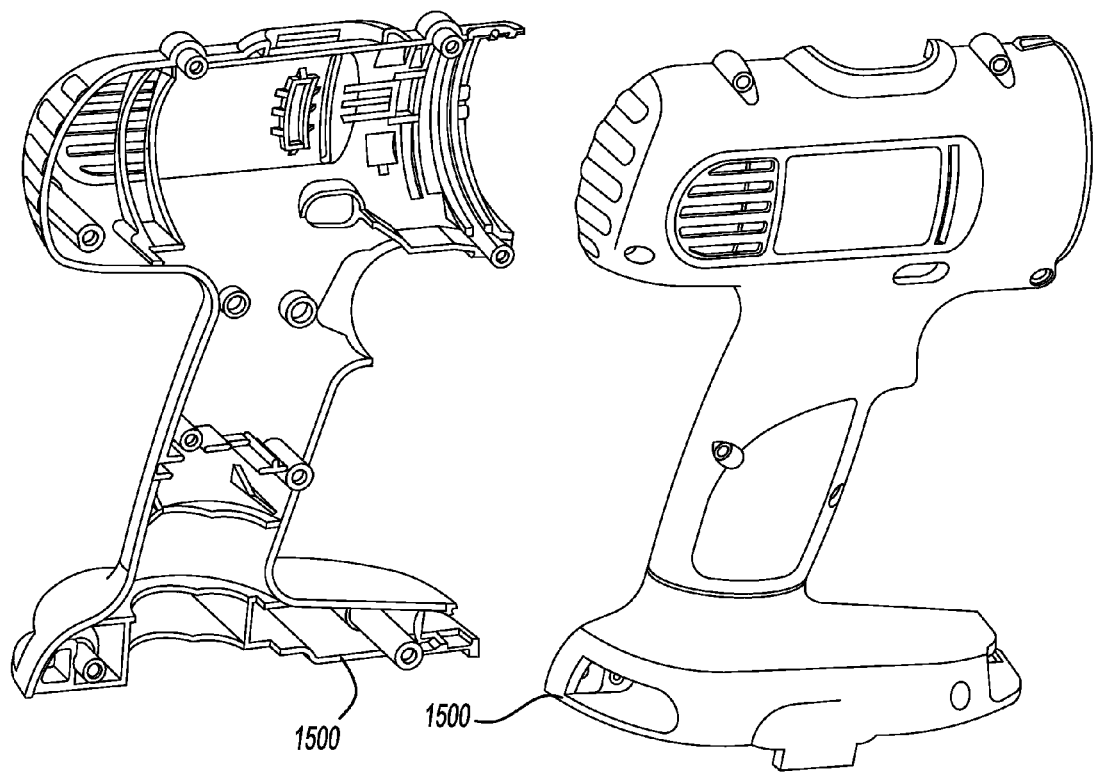
FIG. 15 is a side perspective view of housing halves of a cordless drill.

Battery receptacle 912 may illustratively be a "foot" of a cordless power tool that receives a battery pack, such as battery pack 1100 (FIG. 11). As used herein, a "foot" of a cordless power tool is that portion of the power tool, typically part of the power tool's housing, that is configured to receive a battery pack. For example, battery pack 1100 may be a battery pack for the DEWALT series of 18 volt cordless power tools and battery receptacle 912 would then illustratively be materially the same as the foot of these power tools, such as the DEWALT DW959K-2 drill. FIG. 15 shows housing halves 1500 of the DEWALT DW959K-2 drill, the lower portions of which comprise the foot of this cordless power tool. It should be understood, however, that battery receptacle 912 could be the foot of any cordless power tool that uses a removable battery pack.

Figure 13:
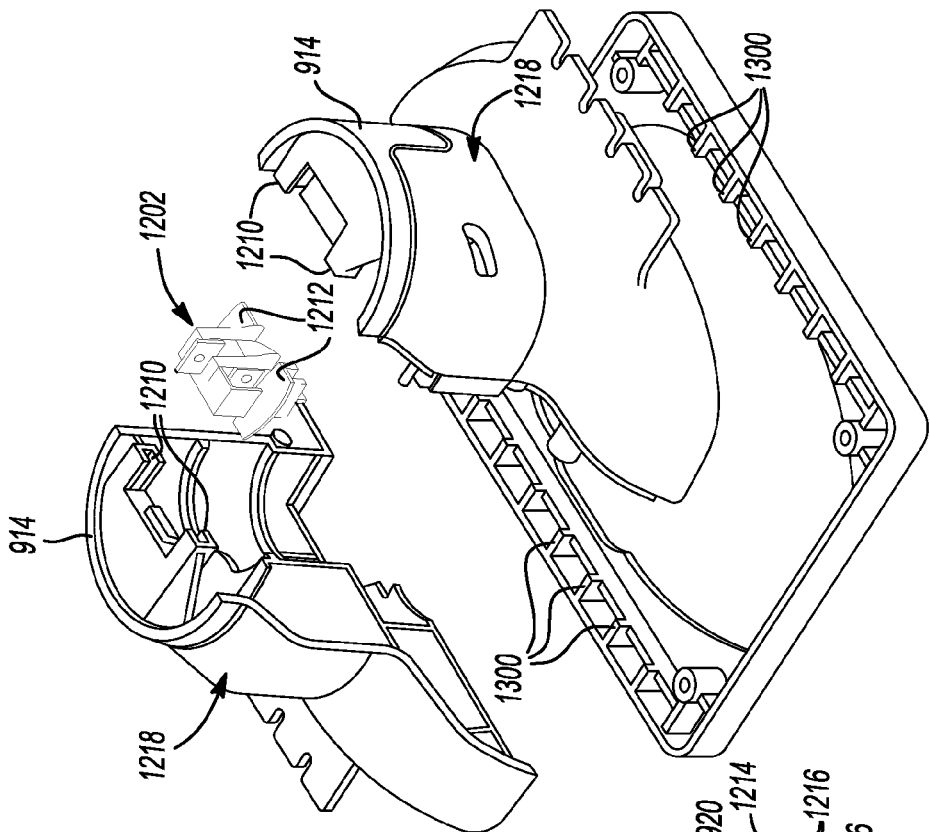
FIG. 13 is an exploded perspective view of the battery receptacle of the control panel of FIG. 9.
Figure 12:
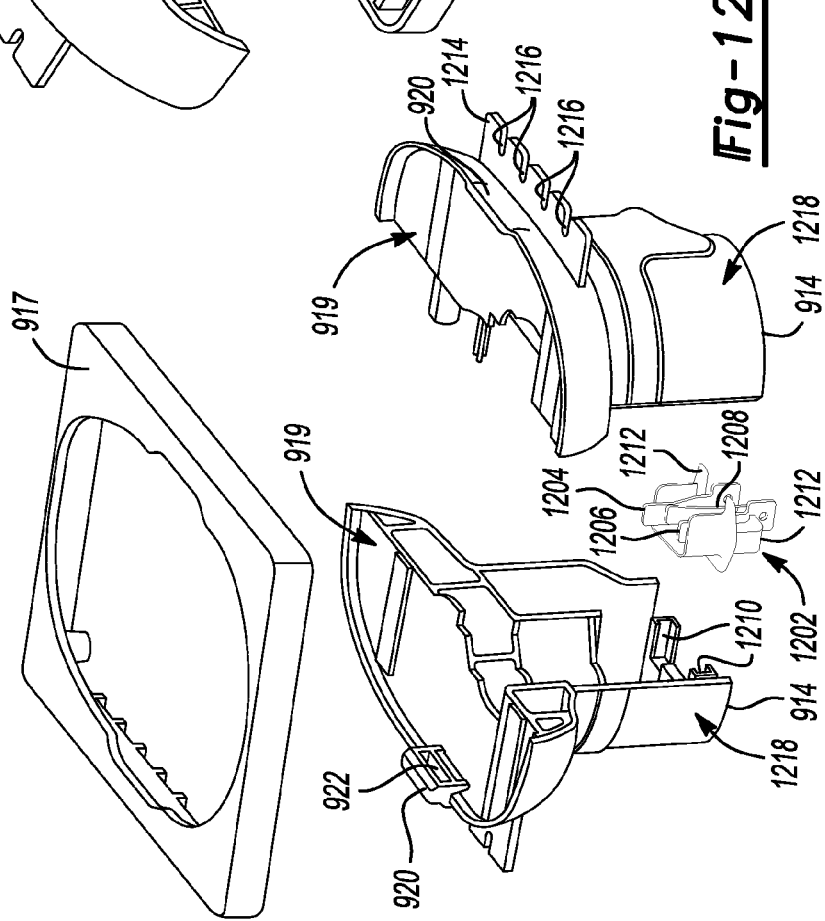
FIG. 12 is an exploded perspective view of a battery receptacle of the control panel of FIG. 9.

With reference to FIGS. 9-12, battery receptacle 912 illustratively includes housing halves 914 mated together to form a housing 915. A collar 917, illustratively a rectangular shaped collar, surrounds housing 915 and includes screw posts 1200 (only one of which is shown in FIG. 12) for receiving screws which secure collar 917 to control panel 806. Housing 915 includes a base portion 919 having an outer plate 916 that conforms to an upper plate 1102 of battery pack 1100 (FIG. 11) and a columnar portion 1218 (FIG. 12) extending from base portion 919. Opposed flanges 1214 (FIG. 12) project outwardly from housing halves 914 at opposed edges of outer plate 916. Opposed flanges 1214 include slots 1216 therein that mate with inwardly extending projections 1300 (FIG. 13) of collar 917 to secure housing 915 to control panel 806 when collar 917 is secured to control panel 806.

Housing 915 has a bore or passageway 918 therein that conforms to a tower 1104 of battery pack 1100 that extends from a base 1101 of battery pack 1100. Battery receptacle 912 further includes opposed catches 920 at opposed sides of outer plate 916 which mate with latches 1106 (only one of which is shown in FIG. 11) of battery pack 1100. Catches 920 illustratively include slots 922 that receive projections 1108 of latches 1106 of battery pack 1100. It should be appreciated that latches 1106 of battery pack 1100 are spring latches in which buttons 1110 of latches 1106 are depressed to retract projections 1108 from slots 922 of catches 920. Housing 915 of battery receptacle 912 further includes a keyway 924 in outer plate 916 projecting from bore 918 that receives a key 1124 at the base of tower 1104 of battery pack 1100.

Battery receptacle 912 further includes a connector 1202 (FIG. 12) that mates with terminal block 1112 of battery pack 1100. Connector 1202 is electrically coupled to a starting device for internal combustion engine 804 in a manner similar to that described above. Terminal block 1112 of battery pack 1100 includes power terminals 1114, 1116, temperature sense terminal 1118 (which is connected to a temperature sensing element within battery pack 1100 such as a thermistor) and key 1120 surrounded by a rectangular wall 1122 having a key 1124 projecting outwardly from an end wall. Connector 1202 has corresponding power terminals 1204, 1206. Terminals 1204, 1206 are spaced from each other and have a space 1208 therebetween which receives temperature sense terminal 1118 and key 1120. Terminals 1204, 1206 are surrounded by a rectangular wall 1210. It should be understood that connector 1202 could have a female temperature sense terminal (not shown) if generator 800 includes circuitry to sense the temperature of battery pack 1100.

Housing halves 914 include opposed channels 1208 that receive opposed flanges of connector 1202 to mount connector 1202 in housing 915.

By providing on control panel 806 a battery receptacle 912 that is essentially a foot of a cordless power tool, a user of generator 800 can advantageously use the battery pack for the cordless power tool, such as battery pack 1100, in starting generator 800. Illustratively, battery pack 1100 is not charged by generator 800. Rather, when battery pack 1100 needs charging, it is charged in an external charger, such as the external charger that is typically provided with the cordless power tool when the user purchases the cordless power tool.

By using a battery pack from a cordless power tool, such as battery pack 1100, generator 800 does not require its own battery, which is typically a lead acid type of battery. The user need not purchase the lead acid battery, avoids the need to maintain such a lead acid battery, and generator 800 is lighter since the weight of the lead acid battery is eliminated.

Figure 14:
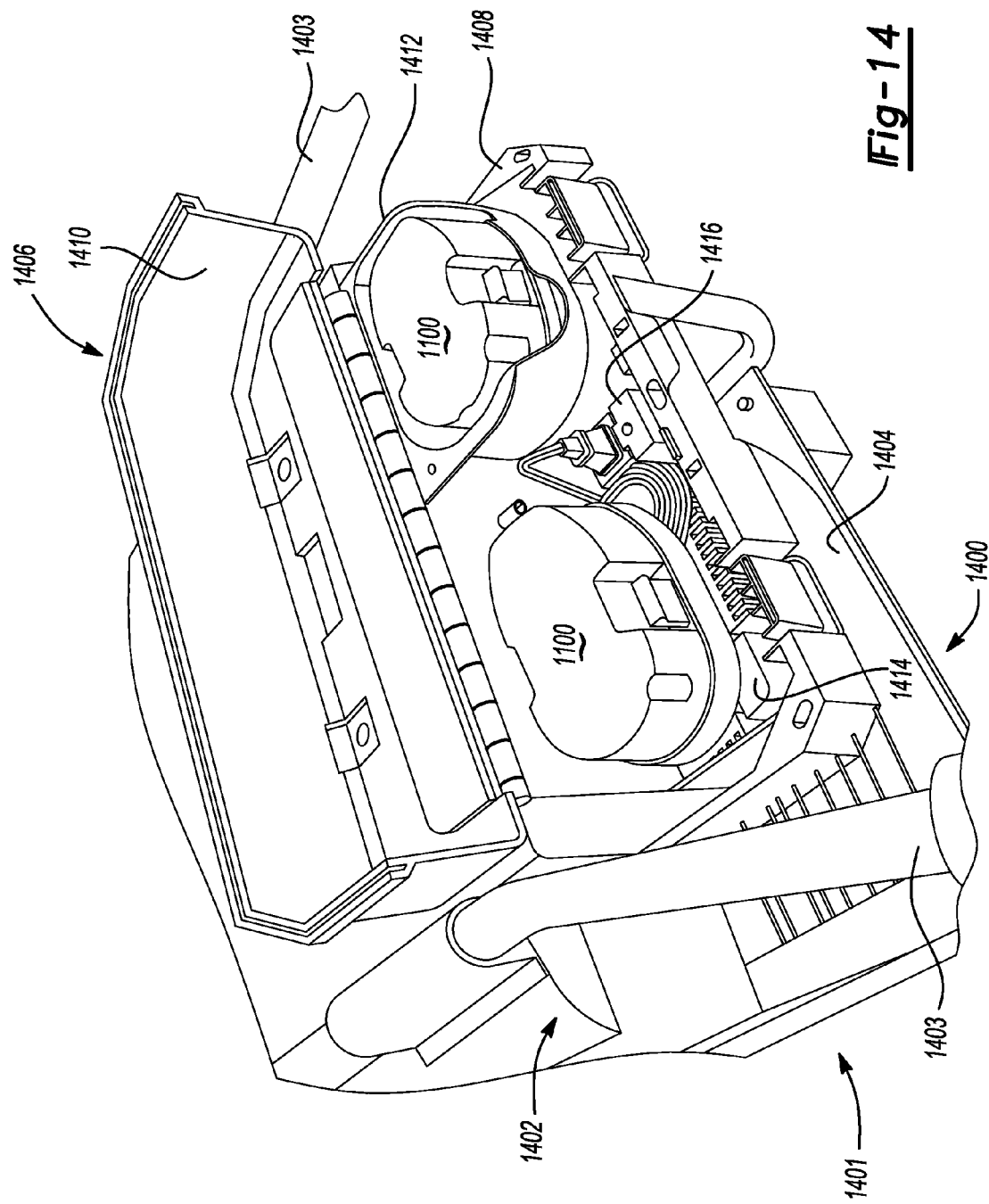
FIG. 14 is a side perspective view of a portable generator in accordance with an aspect of the invention.

FIG. 14 shows another aspect of the invention. In the embodiment of FIG. 14, a portable electric generator 1400 includes a frame 1402 that supports an internal combustion engine 1404. Frame 1402 may illustratively support wheels 1401 (only one of which is shown in FIG. 8) and include handles 1403 for facilitating moving generator 1400. An electric generator device (hidden from view in FIG. 14) is coupled to an output shaft of internal combustion engine 1404. The electric generator device generates AC power, such as has been described above. The AC power may illustratively be 120 VAC (or 110 or 115 VAC) and may also illustratively be 240 VAC (or 220 or 230 VAC). It may be 60 Hz, or may be 50 Hz. Generator 1400 also includes a control panel including AC outlets (not shown in FIG. 14).

Generator 1400 further includes enclosure 1406 mounted to frame 1402. Enclosure 1406, which may illustratively be a water resistant enclosure, includes a rectangular tub shaped base portion 1408 and hinged lid 1410. Base portion 1408 of enclosure 1406 includes battery receptacle 1412, charger 1414 and AC outlet 1416. Battery receptacle 1412 is configured to receive a battery pack from a cordless power tool, such as battery pack 1100. In this regard, battery receptacle 1412 may be configured to receive a tower type of battery pack, such as battery pack 1100, as is charger 1414. As such, battery receptacle 1412 may illustratively have a configuration similar to battery receptacle 912 described above. Battery receptacle 1412 may alternatively be configured to receive a rail type of battery pack, such as battery pack 16 shown in U.S. Pat. No. 6,653,815, the disclosure of which is incorporated herein in its entirety by reference. As such, battery receptacle 1412 has a configuration similar to that on the foot of tool 10 of U.S. Pat. No. 6,653,815. That is, battery receptacle 1412 includes a pair of grooves that receives guide rails of the rail type battery pack. It also includes a connector configured to mate with the terminal block of the rail type battery pack.

Charger 1414 may illustratively be a stand alone charger such as the charger that is typically supplied with the power tool when the user purchases the power tool and is thus mounted in base portion 1408 of enclosure 1406 and plugged into AC outlet 1416 in enclosure 1406. Charger 1414 may illustratively be a multi-port charger having a plurality of ports to that charger 1414 can receive a plurality of battery packs 1100 at any one time to charge them simultaneously. Battery receptacle 1412 is electrically coupled to an electrically powered starting device for starting internal combustion 1404, such as the starting devices described above.

In use, a battery pack, such as battery pack 1100, from a cordless power tool is placed in battery receptacle 1412 and provides electrical power to start internal combustion engine 1404. Charger 1414 is used to charge one or more battery packs 1100. In this regard, once internal combustion engine 1404 is started, the battery pack 1100 in battery receptacle 1412 can be removed from battery receptacle 1412 and placed in charger 1414 to charge that battery pack 1100.

Internal combustion engine 1404 may have a pull start that can be used to start internal combustion engine 1404 as well as the electrical starter circuit described above. The pull start could then be used to start internal combustion engine 1404 when the battery pack 1100 is discharged. Battery pack 1100 can then be placed in charger 1414, charged, and then placed in battery receptacle 1412 to provide electrical power to the electrical starting device so that internal combustion engine can be electrically started.

Figure 16:
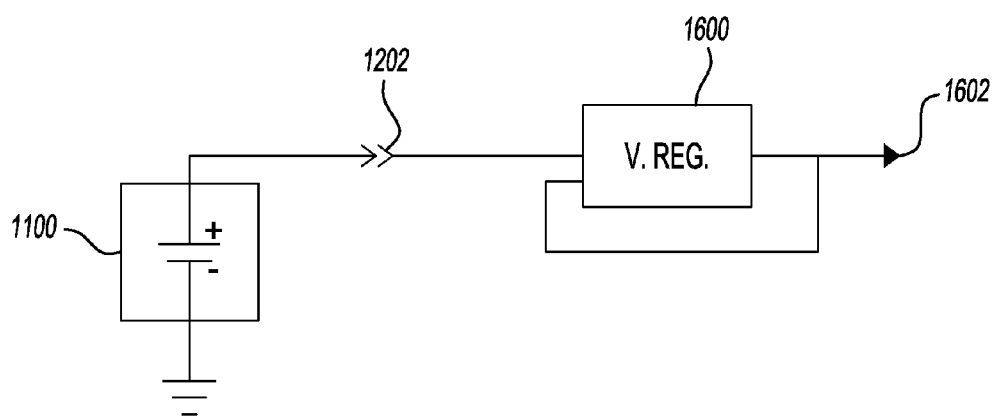
FIG. 16 is a schematic showing a voltage regulation circuit coupling the battery receptacle of the portable generator of FIG. 8 to the starting device of the portable generator of FIG. 8.

In an aspect of the invention, portable generator 800 is adapted to use universal battery packs having different voltages. More specifically with reference to FIG. 16, portable generator 800 includes a voltage regulation circuit 1600 that couples connector 1202 of battery receptacle 912 to the starting device for internal combustion engine 804, thus coupling the output of battery pack 1100 to the starting device for internal combustion engine 804 when battery pack 1100 is received in battery receptacle 912. Voltage regulation circuit 1600 illustratively provides at its output 1602 a set voltage at the appropriate level for the starting device for internal combustion engine 804. For example, if the starting device for internal combustion engine 804 utilizes a 12 volt DC starter motor, then voltage regulation circuit 1600 provides 12 volts DC at its output 1602. Voltage regulation circuit 1600 may illustratively monitor the voltage at its output 1602 and adjust its output accordingly to maintain the appropriate voltage level.

Voltage regulation circuit 1600 may be any known type of voltage regulation circuit. It may, for example, be a DC-DC converter in which the switching device(s) in the DC-DC converter are switched with a pulse width modulated signal and the duty cycle of the pulse width modulated signal is controlled to obtain the desired voltage level at output 1602. That is, voltage regulation circuit 1600 compares the voltage at its output 1602 with the desired voltage and adjusts the duty cycle of the PWM signal to maintain the output voltage constant at the desired level.

Voltage regulation circuit 1600 may illustratively be a buck converter type of DC-DC converter. Since buck converters are step-down converters, the starter motor used would then illustratively be a low voltage starter motor such that the voltage of the starter motor is no greater than the lowest voltage universal battery pack utilized. Alternatively, voltage regulation circuit 1600 may illustratively be a boost converter type of DC-DC converter. Since boost converters are step-up converters, the starter motor used would then illustratively be a higher voltage starter motor such that the voltage of the starter motor is no lower than the highest voltage universal battery pack utilized. Voltage regulation circuit 1600 may also illustratively be a buck-boost type of DC-DC converter which can both step-up and step-down. The starter motor utilized can then have a voltage that falls between the voltage of the highest voltage universal battery pack utilized and the voltage of the lowest voltage universal battery pack utilized. It should be understood that generator 1400 can similarly have voltage regulation circuit 1600.

Figure 17:
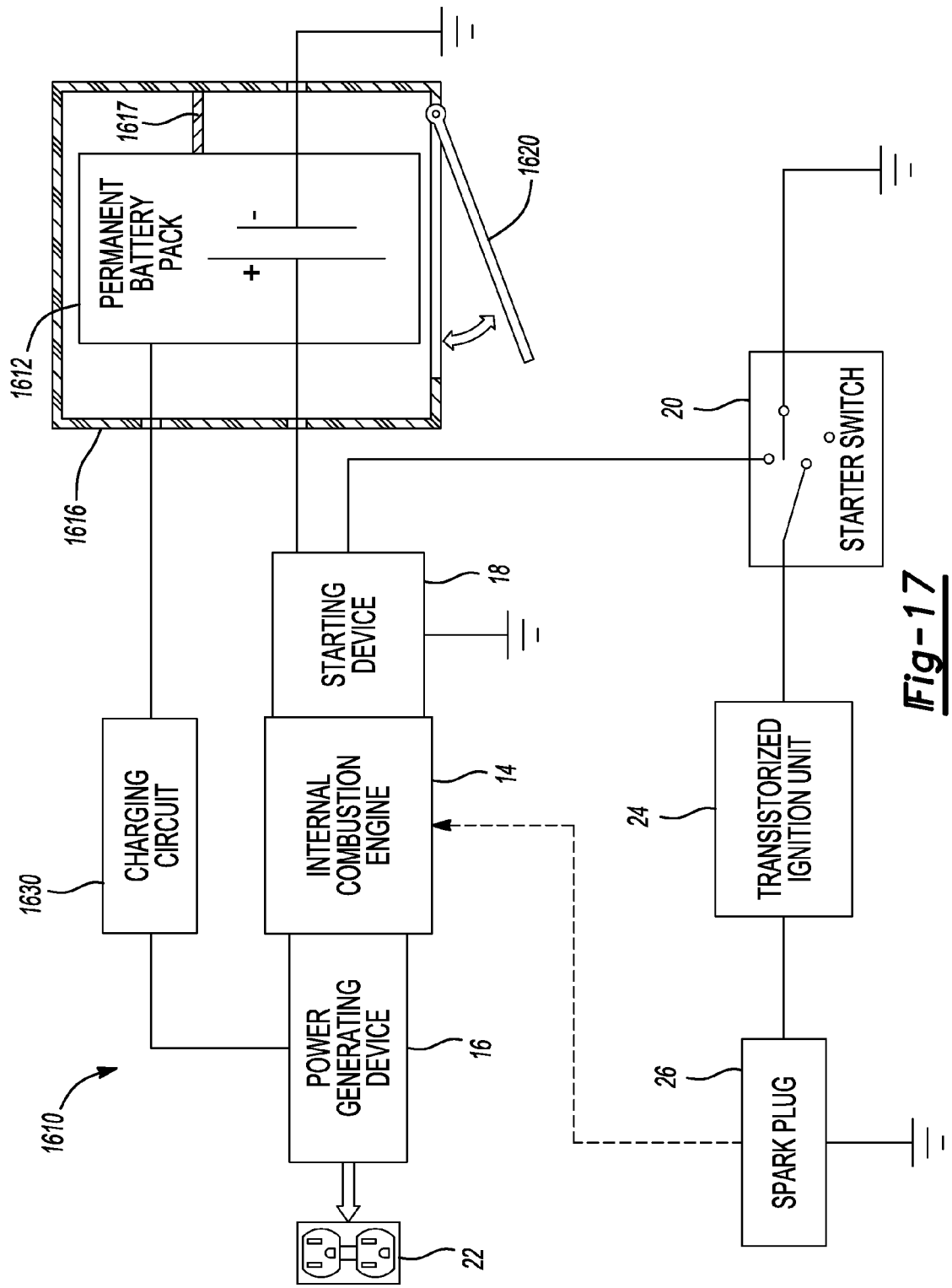
FIG. 17 is a simplified block diagram of a portable generator system, in accordance with another alternate embodiment of the present invention, wherein the system utilizes a permanently mounted universal battery pack to start an internal combustion engine of the generator system.

With reference now to FIG. 17, a simplified block diagram of a portable generator system 1610, according to additional features is shown. The generator system 1610 utilizes a battery pack 1612 that is mounted to generator system 1610 with fastening devices, such as one or more hold down members shown representatively by 1617. Hold down member(s) 1617 may be removably affixed to housing 1616 such as with screws (not shown). Battery pack 1612 is thus "permanently mounted" in housing 1616 in the sense that it is not easily removable by hand. But battery pack 1612 can be removed and replaced in the event of failure, such as by unfastening hold down member(s) 1617, removing and replacing back pack 1612, and refastening hold down member(s) 1617. Battery pack 1612 may comprise a battery pack such as the battery pack 1100 (FIG. 11). Further, battery pack 1612 may comprise any suitable battery pack such as a NiCad universal battery pack of 12, 14.4 or 18 volts. In this example however, the battery pack 1612 is permanently mounted within a housing 1616 mounted in a frame of generator system 1610, such as frame 1402 (FIG. 14). The housing 1616 may define similar components as described with respect to the enclosure 1406 (FIG. 14), but in this example, the housing 1616 surrounds the battery pack 1612. The housing 1616 may include any suitable containment structure. It is contemplated that the housing 1616 may provide a removable portion, such as a door or cover plate 1620 to gain access to the battery pack 1612 in the event the battery pack 1612 needs to be replaced. In one example, the cover plate 1620 may be removably secured to the housing 1616, such as by fasteners (not shown).

According to an additional feature of the generator system 1610 shown in FIG. 17, a charging circuit 1630 may be provided. The charging circuit 1630 may be electrically connected to the power generating device 16 whereby the power generating device may provide the charging circuit with power to charge the battery pack 1612. It should be appreciated that while the charging circuit 1630 is specifically illustrated for use with the generator system 1610, it may easily be adapted for use in any of the generator systems disclosed herein. Charging circuit 1630 would illustratively be switched off during starting internal combustion engine 10 of generator system 1610 and then switched on after internal combustion engine 10 is started.

The generator system 1610 utilizes battery pack 1612 to start the IC engine 14 that turns the power generating device 16. The generator system 1610 may additionally include a starting device 18 connected to the battery pack 1612 and the starter switch. The starting device 18 may comprise any suitable starting device such as a starter motor and tarter solenoid (see e.g., FIG. 2). The starter switch 20 may be connected to the transistorized ignition unit 24, which is in turn connected to the a spark plug 26. The staring device 18 may be used to turn the IC engine 14 at a rate sufficient to start the IC engine 14. Once the IC engine 14 is started, the IC engine 14 drives power generating device 16. The power generating device 16 may output AC power usable by a load connected to the electrical outlet. Concurrently, the power generating device may provide power to the charging unit 1630 to charge the battery pack 1612. The power generator device may alternatively comprise a generator alternator (FIG. 2).

Figure 18:
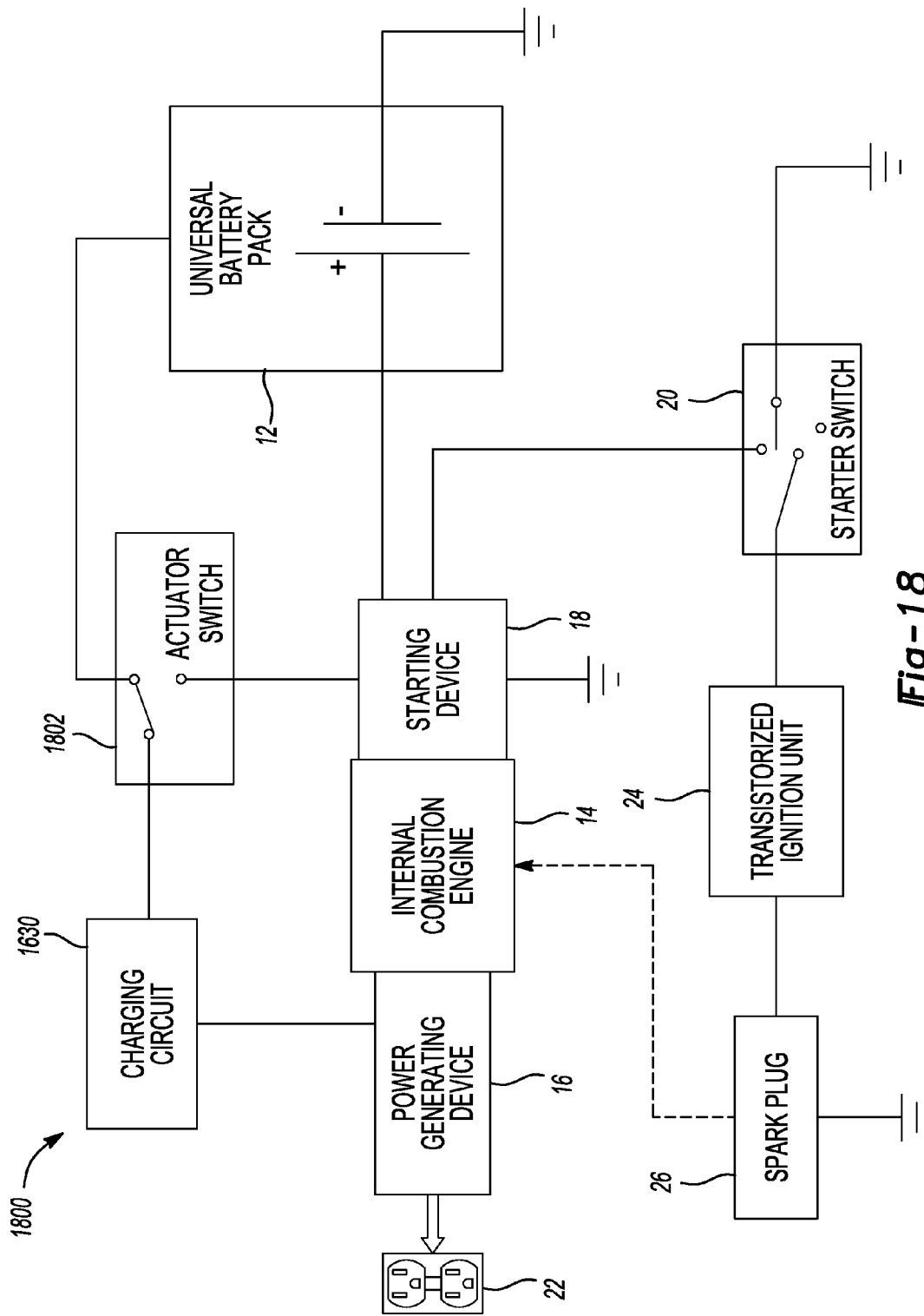
FIG. 18 is a simplified block diagram of a portable generator system, in accordance with another alternate embodiment of the present invention, wherein the system utilizes an actuator switch for connecting a portable universal battery pack to either a starting device to start an internal combustion engine of the generator system or to a charging circuit for charging the portable universal battery pack.

With reference now to FIG. 18, a simplified block diagram of a portable generator system 1800, according to additional features is shown. The portable generator system 1800 includes an actuator switch 1802. The actuator switch 1802 is switchable to provide electrical connection between the universal battery pack 12 and the starting device 18 or between universal battery pack 12 and the charging circuit 1630. In this example, a user may place the universal battery pack 12 into the battery receptacle (such as battery receptacle 912, FIG. 9) and switch the actuator switch to a 'Start' position, thereby electrically coupling the universal battery pack 12 to the starting device 18. Once the actuator switch is in the 'Start' position, the starter switch 20 may also be placed into the 'Start' position such that the universal battery pack 12 provides power to the starting device 18 (such as a starter solenoid 34, FIG. 2). While the universal battery pack 12 has been shown, it is appreciated that alternatively, the permanently mounted battery pack 1612 in housing 1616 (FIG. 17) may be used.

Once the IC engine 14 is started, the spring loaded starter switch 20 may return to the 'ON' position. In the 'ON' position, the starter switch may direct power from the ignition unit 24 to the spark plug 26. Each time spark plug 26 fires, spark is provided to IC engine 14, which is utilized to ignite a compressed fuel and air mixture present in a cylinder (not shown) during a compression cycle of IC engine 14. When IC engine 14 is running it turns alternator 36, which creates an output voltage usable to provide AC power at outlet 22.

In addition, once the IC engine 14 has been started, the actuator switch 1662 may be moved to a 'Charge' position. In the 'Charge' position, the actuator switch 1662 may electrically connect the charging circuit 1630 to universal battery pack 12 to charge the universal battery pack 12. It is contemplated that the actuator switch 1662 may be spring-loaded so that it returns to the 'Charge' position upon successfully starting the IC engine 14. It is also contemplated that the operation of the actuator switch 1662 and the starter switch 20 may be combined into a single switch. In this way, a single start switch of the generator system 1660 may be wired such that charging is deactivated when the start switch is turned to the 'Start' position and then reactivates charging when the momentary start switch is released.

Figure 19:
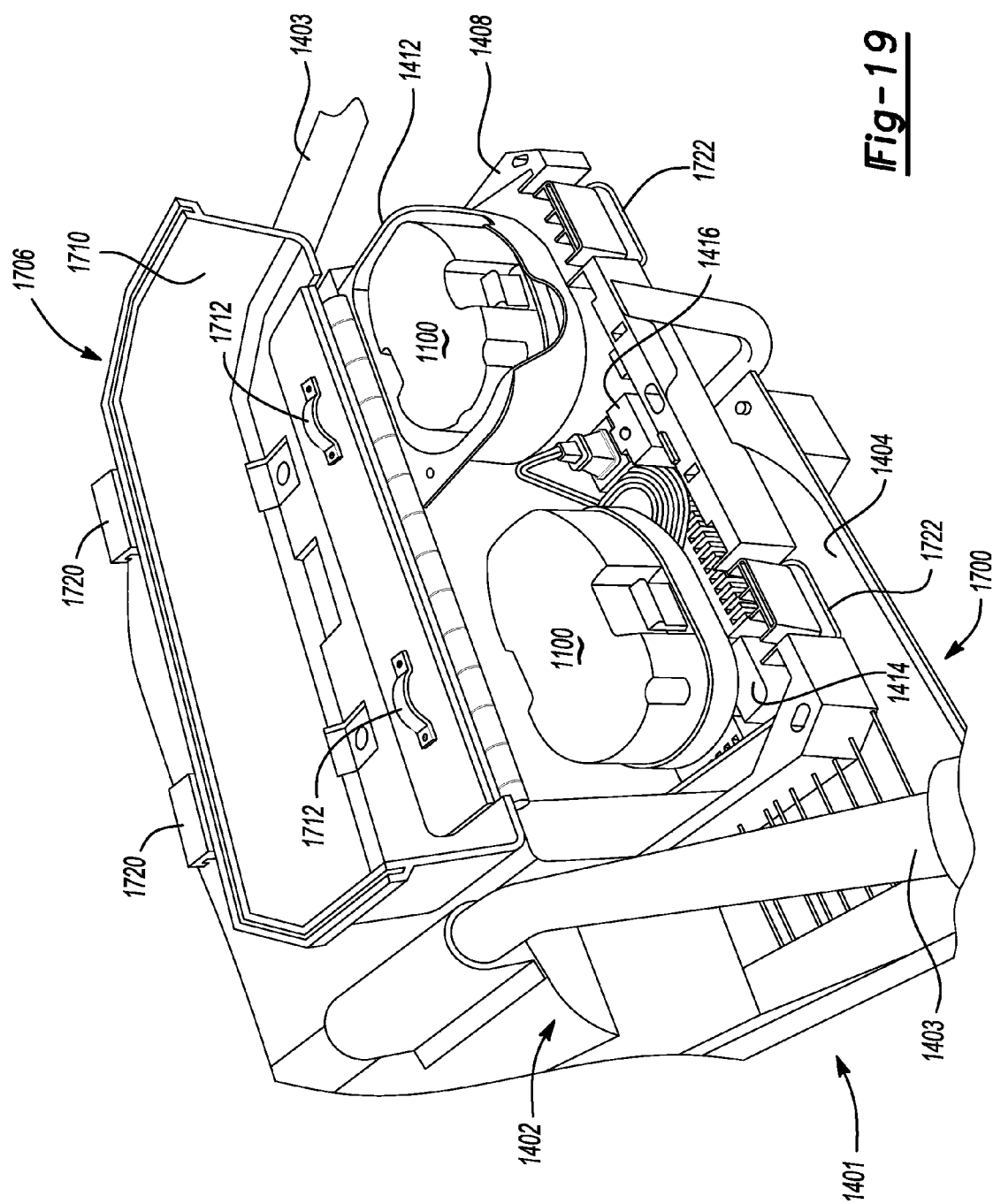
FIG. 19 is a side perspective view of the portable generator of FIG. 14 shown with biasing elements in a lid of a battery pack/charger enclosure according to another embodiment.
Figure 20:
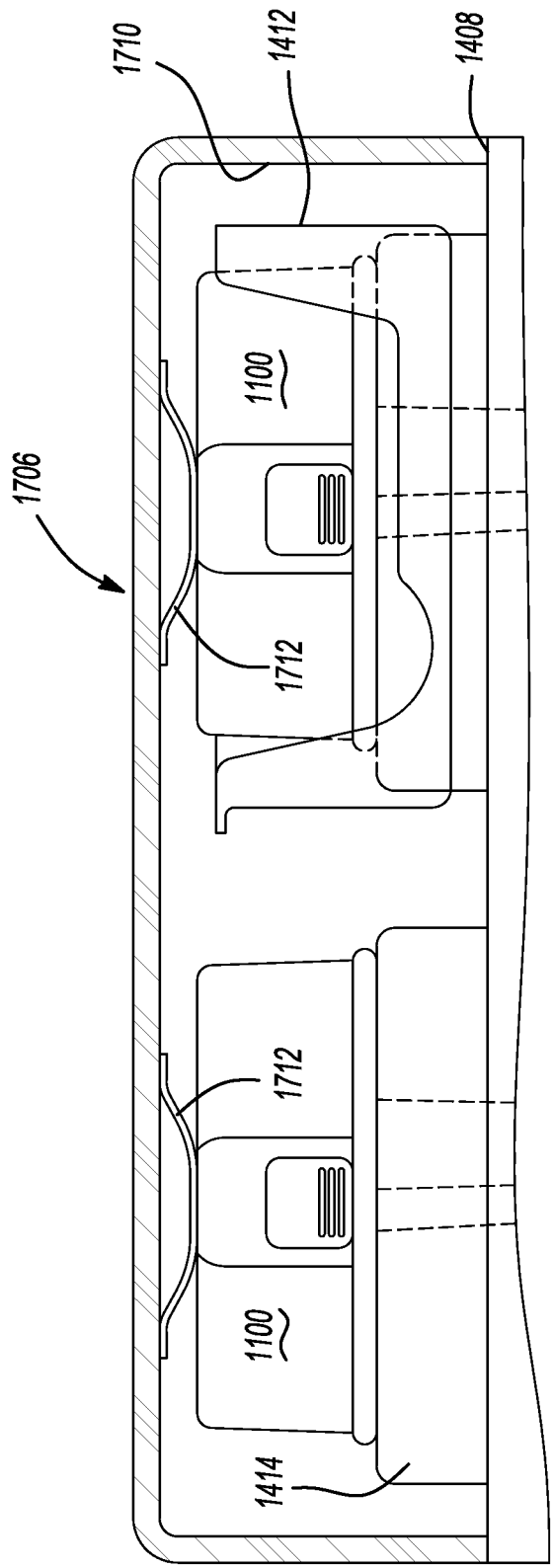
FIG. 20 is a sectional view taken along line 20-20 of FIG. 19.

With reference now to FIGS. 19 and 20, a portable generator 1700 having an enclosure 1706 is shown. The portable generator 1700 may include the frame 1402 that supports the IC engine 1404. The frame 1402 may illustratively support wheels 1401 (FIG. 8), and include handles 1403 for facilitating moving the generator 1700.

An electric generator device (hidden from view in FIG. 14) may be coupled to an output shaft of internal combustion engine 1404. The electric generator device generates AC power, such as has been described above. The AC power may illustratively be 120 VAC (or 110 or 115 VAC) and may also illustratively be 240 VAC (or 220 or 230 VAC). It may be 60 Hz, or may be 50 Hz. Generator 1700 may also include a control panel including AC outlets (not shown in FIG. 14).

Generator 1700 further includes enclosure 1706 mounted to frame 1402. The enclosure 1706, which may illustratively be a water resistant enclosure, includes a rectangular tub shaped base portion 1408 and hinged lid 1710 including biasing members 1712. As will be described, the biasing member 1712 urge the batteries 1100 into the respective battery receptacle 1412 and charger 1414 when the hinged lid 1710 is in a closed position. The biasing member 1712 may comprise any biasing structure such as a leaf spring for example. A pair of latches 1720 may be provided on the hinged lid 1710 for securably coupling to a pair of hooks 1722 provided on the base portion 1408 when hinged lid 1710 is in the closed position.

The base portion 1408 of enclosure 1406 includes battery receptacle 1412, charger 1414 and AC outlet 1416. Battery receptacle 1412 is configured to receive a battery pack from a cordless power tool, such as battery pack 1100. In this regard, battery receptacle 1412 may be configured to receive a tower type of battery pack, such as battery pack 1100, as is charger 1414. As such, battery receptacle 1412 may illustratively have a configuration similar to battery receptacle 912 described above. Battery receptacle 1412 may alternatively be configured to receive a rail type of battery pack, such as battery pack 16 shown in U.S. Pat. No. 6,653,815, the disclosure of which is incorporated herein in its entirety by reference. As such, battery receptacle 1412 has a configuration similar to that on the foot of tool 10 of U.S. Pat. No. 6,653,815. That is, battery receptacle 1412 includes a pair of grooves that receives guide rails of the rail type battery pack. It also includes a connector configured to mate with the terminal block of the rail type battery pack.

With specific reference now to FIG. 20, the hinged lid 1710 is shown in the closed position. As illustrated, the biasing members 1712 engage an upper surface of the battery packs 1100 and urge them downward into the receptacles 1412 and charger 1414. As a result, electrical connection of battery packs 1100 in receptacle 1412 and charger 1414 may be maintained during movement of the generator system 1700 such as by physical movement of the generator system 1700 as a whole or by vibratory movement communicated by the IC engine 14 during use. It is appreciated that the biasing members 1712 may additionally be provided on the housing 1616 disclosed for use with the permanent battery pack 1612 (FIG. 17).

Figure 21:
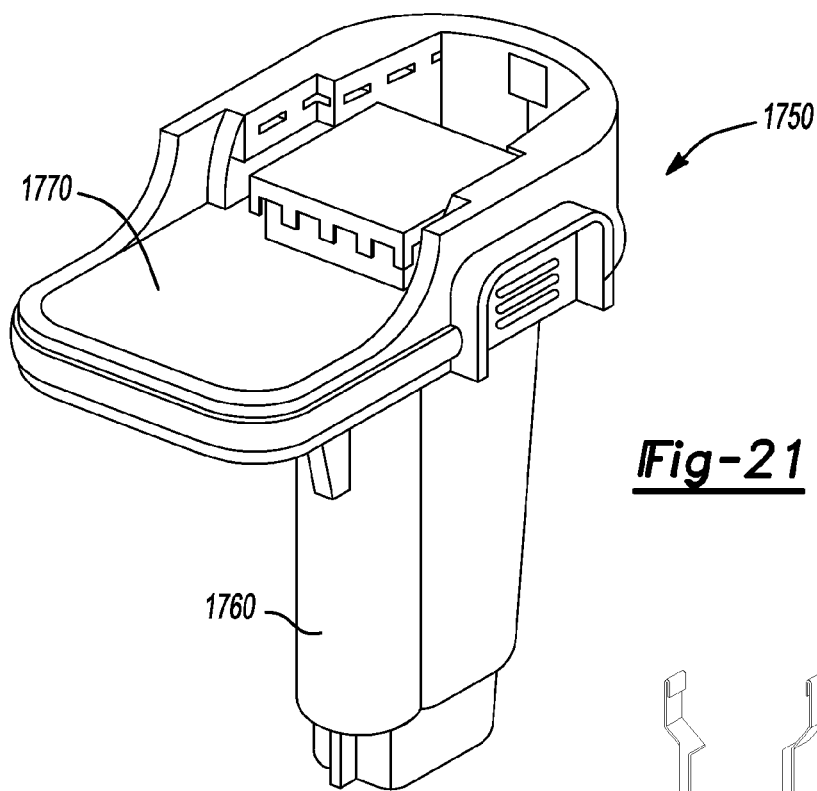
FIGS. 21 and 22 are side perspective views of adapters for accepting battery packs having various geometries.
Figure 22:
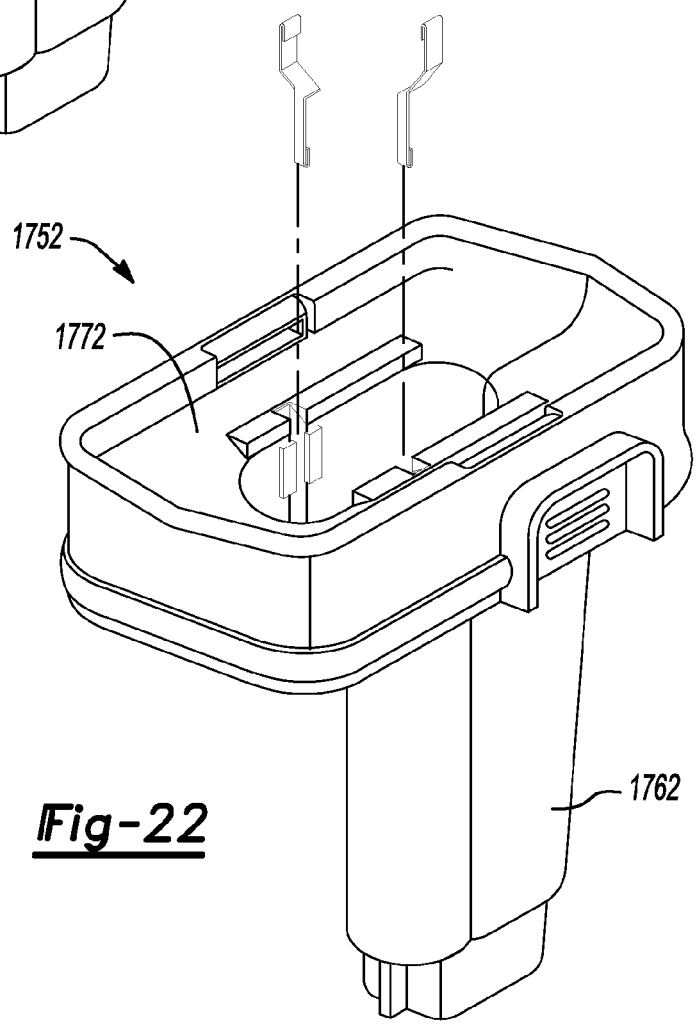

Turning now to FIGS. 21 and 22, a pair of adapters 1750 and 1752 according to additional features of the present teachings are illustrated. The adapters 1750 and 1752 each have insertion portions 1760 and 1762, respectively for receipt into battery receptacles 912 (FIGS. 8-10) and/or 1412 (FIGS. 14, 19 and 20). The adapter 1750 has a battery receptacle portion 1770 while the adapter 1752 has a battery receptacle portion 1772. Terminals 1776 may be located in the battery receptacle portion 1772 for electrical communication with a battery pack (not shown) received into the adapter 1752 in the battery receptacle portion 1772. As will be described, the adapters may be selectively inserted into any of the battery receptacles 912, and/or 1412 enabling battery receptacles 912 and or 1412 to accept battery packs having different footprints. In one aspect, these battery packs may be battery packs for use with power tools such as for different brands of power tools. Footprint as used with respect to a battery back relates to a battery receptacle portion 1772 of adapter 1752 means that part of the battery pack that is received in the battery receptacle portion 1772.

As can be appreciated, the respective battery receptacle portions 1770 and 1772 may define complementary geometry to accept battery packs having a footprint distinct from the tower 1104 of the DEWALT battery pack 1100 described in the examples above (FIG. 11). During use, a desired adapter 1750 or 1752 may be selectively inserted into battery receptacle 912, and/or 1412. One skilled in the art will appreciate that the insertion portions 1760 and 1762 mate with the receptacles 912 and/or 1412 similar to a battery pack 1100. Once the desired adapter has been inserted, a battery pack (not shown) having complementary mating structure with the battery receptacle portions 1770 or 1772 may be selectively inserted into the adapter 1750, 1752.

In one example, the additional height realized by using the adapter 1750, 1752 may be accommodated by the biasing member 1712. In another example, other biasing members and/or hinged lids 1710 may be provided to accommodate various geometry battery packs.

Figure 23:
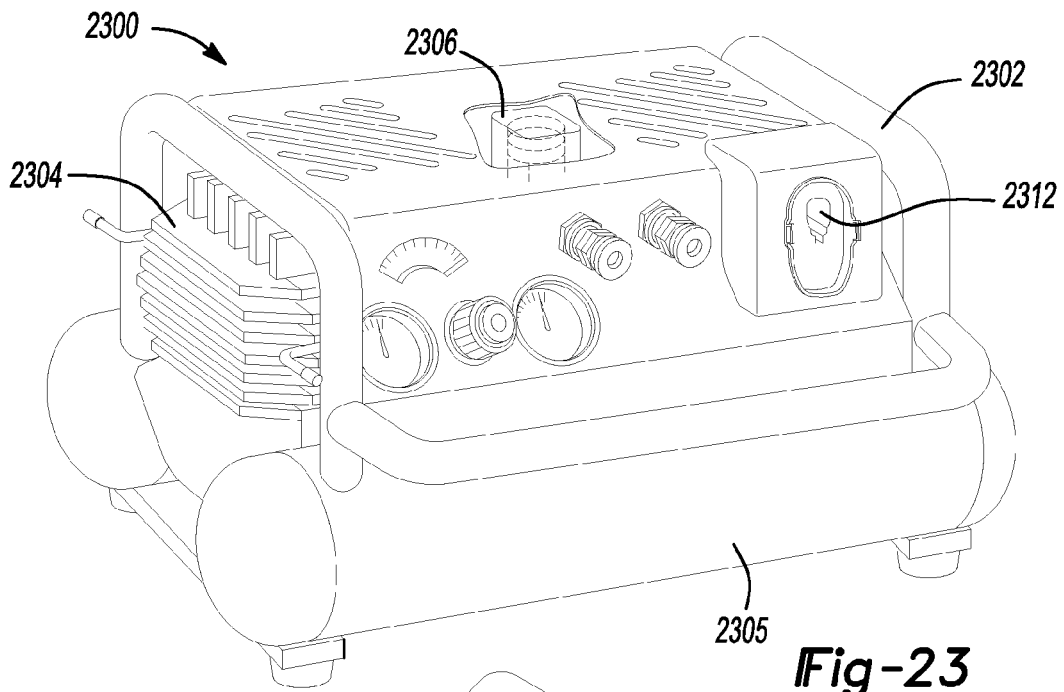
FIG. 23 is a side perspective view of a compressor in accordance with an aspect of the invention.

FIG. 23 shows a compressor 2300 in accordance with an aspect of the invention. The compressor 2300 may incorporate any of the features discussed herein with respect to the portable generators 800 and/or 1400. The compressor 2300 includes a frame 2302 that supports an internal combustion engine 2304, an output device such as air compressor 2306 driven by the internal combustion engine 2304, and an air tank 2305 coupled to an output of the air compressor 2306. A battery receptacle 2312 may be electrically coupled to an electrically powered starting device for starting the internal combustion engine 2304 and/or charging the battery, such as the starting devices and charging circuits described above. In this way, the power generating device 16 may be replaced with an output device such as the compressor 2306, or other associated output of the compressor 2300.

Figure 24:
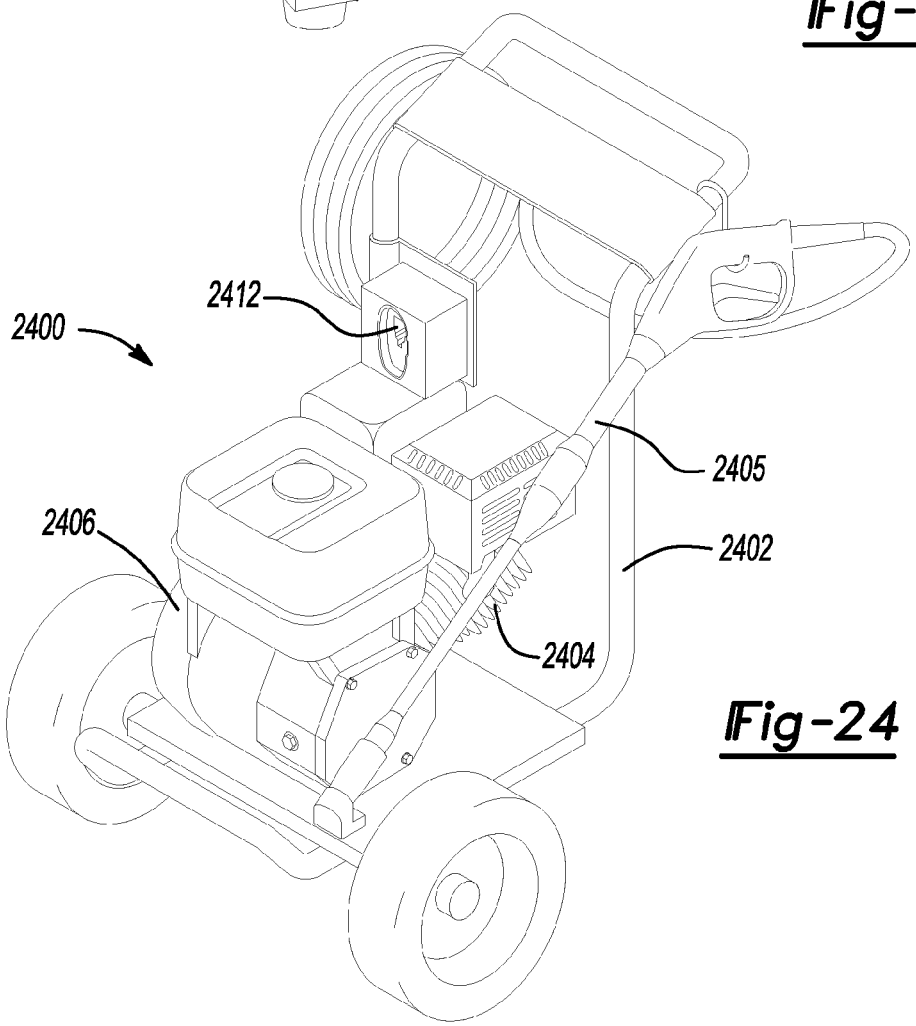
FIG. 24 is a side perspective view of a power washer in accordance with an aspect of the invention.

FIG. 24 shows a power washer 2400 in accordance with an aspect of the invention. The power washer 2400 may incorporate any of the features discussed herein with respect to the portable generator 800 and/or 1400. The power washer 2400 includes a frame 2402 that supports an internal combustion engine 2404 and an output device such as a pump 2306 driven by the internal combustion engine 2304. An output of pump 2306 is coupled to a movable spray wand 2405. A battery receptacle 2412 may be electrically coupled to an electrically powered starting device for starting the internal combustion engine 2404 and/or charging the battery, such as the starting devices and charging circuits described above. In this way, the power generating device 16 may be replaced with an output device such as a pressure regulating device, spray wand 2405, or other associated output of the power washer 2400.

Figure 25:
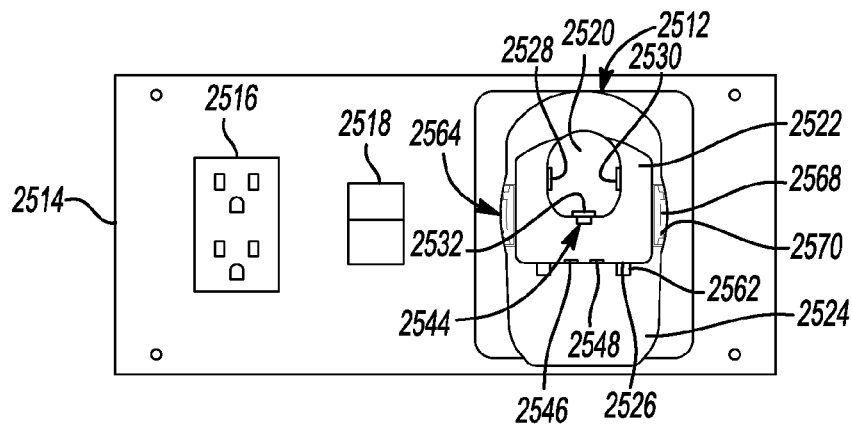
FIG. 25 is a front view of a control panel incorporating a battery receptacle embodiment.
Figure 26:
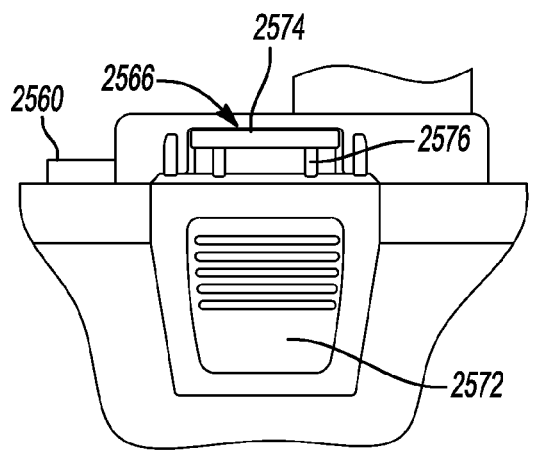
FIG. 26 is a partial elevation view of a battery pack corresponding to the battery receptacle of FIG. 25.
Figure 27:
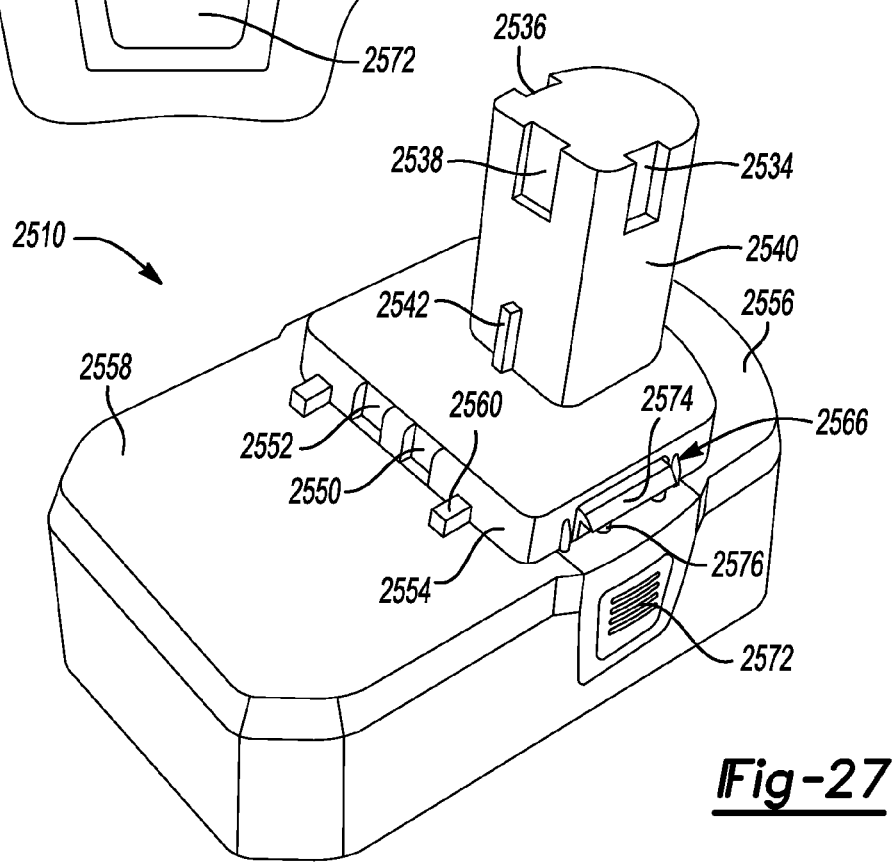
FIG. 27 is a perspective view of a battery pack corresponding to the battery receptacle of FIG. 25.

Referring to FIGS. 25-27, one exemplary preferred tower-type battery pack 2510 and cooperating battery receptacle 2512 is illustrated. This battery receptacle 2512 can be located in a control panel 2514 as illustrated in FIG. 10. The control panel 2514 can include an AC outlet 2516 and an on/off/start switch 2518. The battery receptacle 2512 corresponds generally to a tool foot. The battery receptacle 2512 generally includes a tower recess 2520, a recessed floor 2522, a raised floor 2524 and in intermediate connecting wall 2526 therebetween.

Adjacent the base of the tower receptacle 2520 are three spring contacts 2528, 2530, and 2532. The corresponding battery pack 2510 can include three cooperating battery contacts 2534, 2536, and 2538, respectively, adjacent the distal end of the tower 2540. The battery contacts 2534 and 2536 on the two opposing sides of the tower receptacle 2520 and the cooperating opposing tower 2540 contacts 2534 and 2536 can be the positive and negative terminals. The central battery contact 2532 along the front face of the tower receptacle 2512 and its cooperating tower contact 2538 can be associated with temperature sensing.

Along the front face of the intermediate connecting wall 2526 of the battery receptacle 2512 are two additional battery contacts 2546 and 2548. Corresponding contacts 2550 and 2552 can be provided on an intermediate wall 2554 connecting a raised platform surface 2556 and a lower platform surface 2558. These additional recess contacts 2546 and 2548 and cooperating battery contacts 2550 and 2552, respectively, can correspond to sensors to determine the battery chemistry, e.g., lithium or nicad.

Located along the front face of the battery tower 2540 is a key 2542 in the form of a generally rectangular protrusion. This key 2542 can be positioned along the front face of the tower 2540 to cooperate with a key slot 2544 provided in the battery receptacle 2512 to ensure mating of only a corresponding battery pack 2510 into the cooperating battery receptacle 2512.

The battery tower 2540 extends from a raised platform surface 2556 located at the base of the tower 2540. The raised battery platform 2556 can engage the cooperating recess 2522 of the receptacle 2512. Similarly, battery can include two intermediate platforms 2560 and the receptacle 2512 can include recess 2562 to cooperate with the intermediate platforms 2560. These platforms 2560 and cooperating recesses 2562 can also operate as keys to insure only a corresponding battery pack 2510 mates into the cooperating battery receptacle 2512.

The battery receptacle 2512 and battery pack 2510 can also each include two opposing cooperating latch members 2564 and 2566, respectively. The receptacle latch members 2564 include a protrusion 2568 that forms a lip for the latch. The protrusion 2568 and associated lip can have two slots 2570 extending therethrough. The battery latches 2566 are associated with push-buttons 2572. The battery latches 2566 each include a cooperating protrusion 2574 forming a lip. In addition, two keys in the form of protrusions 2576 extending generally perpendicular to each lip are provided to cooperate with the receptacle slots 2570. The location, number, or both of the slots 2570 and protrusions 2576 can be used to insure only a corresponding battery pack 2510 mates with the cooperating battery receptacle 2512.

Figure 28:
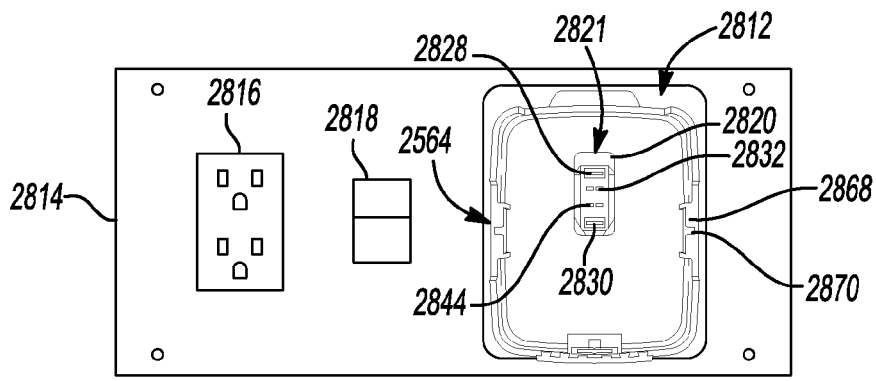
FIG. 28 is a front view of a control panel incorporating another battery receptacle embodiment.
Figure 29:
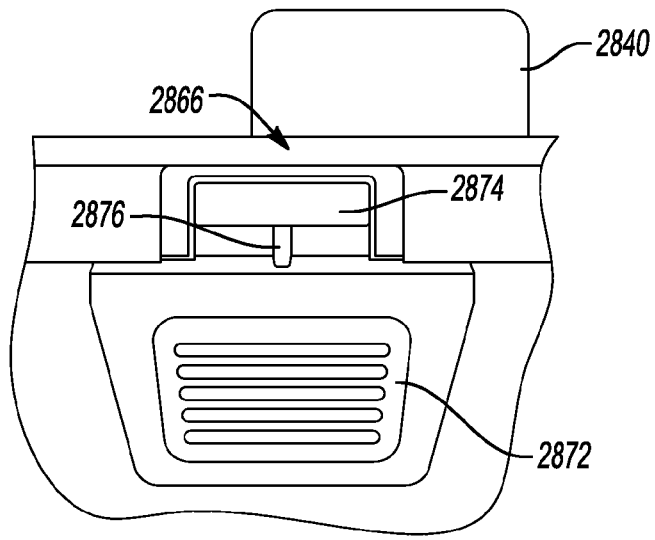
FIG. 29 is a partial elevation view of a battery pack corresponding to the battery receptacle of FIG. 28.
Figure 30:
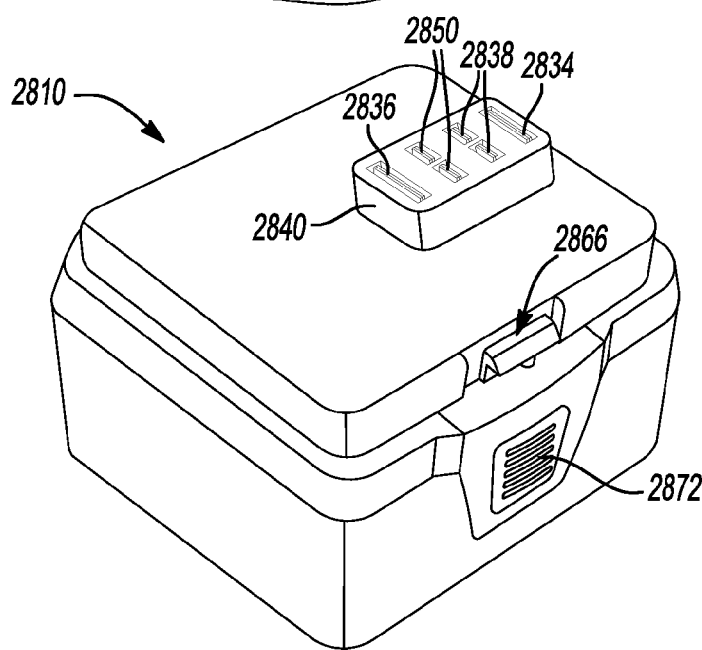
FIG. 30 is a perspective view of a battery pack corresponding to the battery receptacle of FIG. 28.

Referring to FIGS. 28-30, an alternative exemplary preferred tower battery receptacle 2812 and cooperating battery pack 2810 is illustrated. Again, the battery receptacle 2812 can be located in a control panel 2814 including an AC outlet 2816 and an on/off/start switch 2818. The outer shape of the tower 2840 and corresponding tower receptacle 2820 is generally rectangular. A receptacle terminal block 2821 is located at the base of the tower recess 2820 that includes two planar contacts 2828 and 2830 adjacent opposite ends. These end contacts 2828 and 2830 can correspond to the positive and negative battery terminals.

In addition, two pairs of contacts 2832 and 2844 are generally equally spaced between the end contacts 2828 and 2830. These terminal contact pairs 2832 and 2844 can correspond to sensors to determine the battery chemistry, e.g., lithium or nicad.

The corresponding battery pack 2810 can include cooperating spring contacts 2834 and 2836 configured to receive the battery contacts 2828 and 2830, respectively, to provide electrical contact therebetween. Similarly, the battery pack 2810 can include two intermediate spring contact pairs 2838 and 2850 for receiving intermediate contacts 2832 and 2844, respectively.

As discussed above in relation to FIGS. 26-27, the battery receptacle 2812 and battery pack 2810 can also include two opposing cooperating latch member pairs 2864 and 2866. The receptacle latch members 2864 each include a protrusion 2868 that forms a lip of the latch. The protrusion 2868 and associated lip can have one centrally located slot 2870 extending therethrough. The battery latch members 2866 are associated with push-buttons 2872 and move therewith. The battery latch members 2866 each include a cooperating protrusion 2874 forming a lip. In addition, a key in the form of a centrally located protrusion 2876 extends generally perpendicular to the lip to cooperate with the slot 2870. Again, the location, number, or both of the slots 2870 and keys 2876 can be used to insure only a corresponding battery pack 2810 mates with the cooperating battery receptacle 2812.

Referring to FIGS. 31 and 32, another exemplary tower battery receptacle 3112 for receiving a tool battery pack 3110 in a control panel 3114 is illustrated. This exemplary embodiment relies upon a spring-loaded clip 3164 associated with the battery pack receptacle 3112, rather than cooperating features of the battery pack 3110 for retention thereof. The tower recess 3120 is configured to accept the tower 3140 of a cooperating battery pack 3110. The tower recess 3120 includes a terminal block 3121 with contacts 3128 and 3130 configured to cooperate with contacts 3134 and 3136, respectively, of the battery pack 3110 to provide electrical connection therebetween. The tower recess 3120 and terminal block 3121 can alternatively be configured, for example, to include cooperating contacts, for example, in any of the arrangements detailed above with respect to FIG. 10-13, 22, 25-27, or 28-30.

To load a battery pack 3110 into the receptacle, the clip is rotated downward (as indicated by Arrow A in FIG. 32) to a loading and unloading position which permits insertion of the battery tower 3140 into the tower receptacle 3120. The spring biased clip 3164 is then allowed to rotate into a retention position (as seen in FIGS. 31 and 32) under the biasing force of the spring 3168. In the retention position, the clip 3164 retains the battery pack 3110 in position, providing electrical contact between the cooperating receptacle contacts 3128 and 3130 and battery pack contacts 3134 and 3136, respectively. The biasing force of the spring biased clip 3164 acts on a surface 3170 of the battery pack 3110 that opposes the contacts 3134 and 3136. In addition, the clip 3164 can include an arcuate or other portion 3176 configured to contact against the bottom surface 3174 of the battery pack 3110 to support some of the battery pack 3110 weight.

Figure 33:
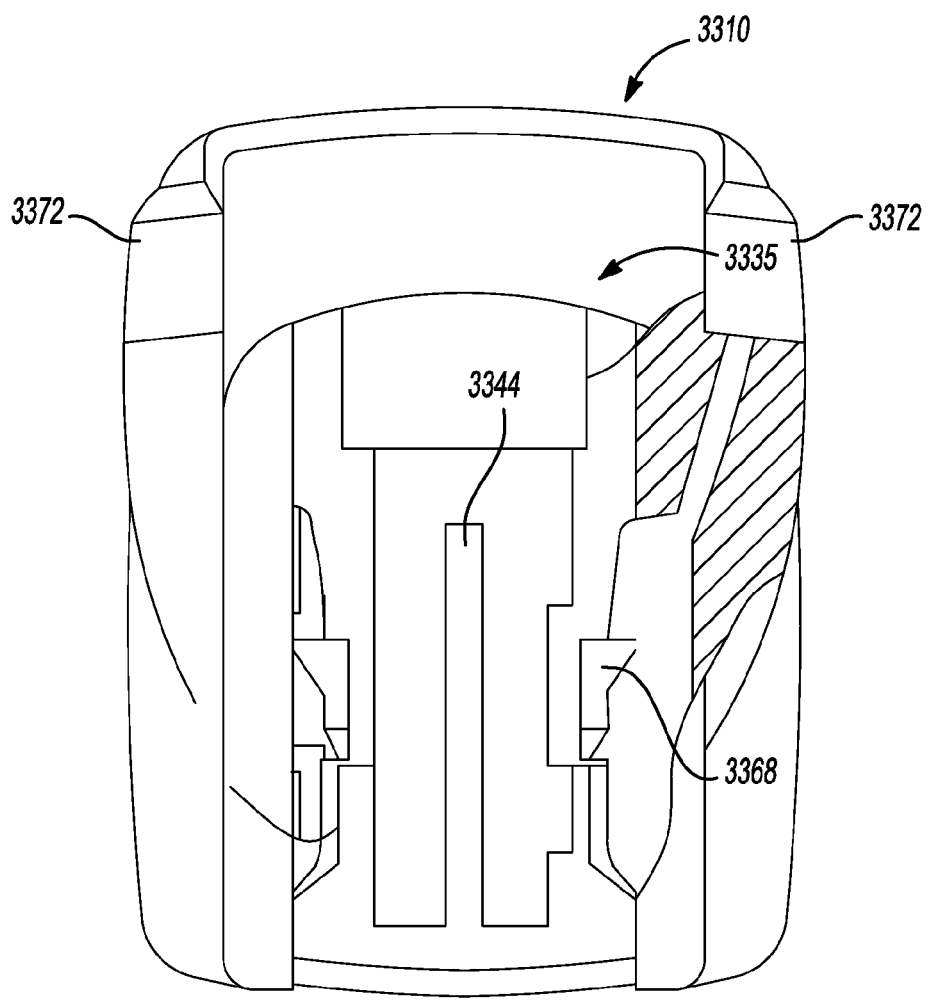
FIG. 33 is a top plan view with a partial cross-section of a battery pack corresponding to the battery receptacle of FIG. 35.
Figure 34:
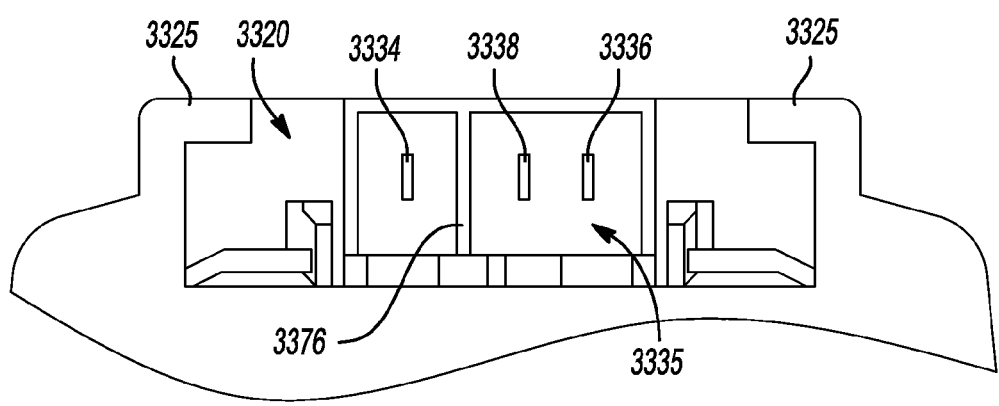
FIG. 34 is an enlarged partial side view of the battery pack of FIG. 33.
Figure 35:
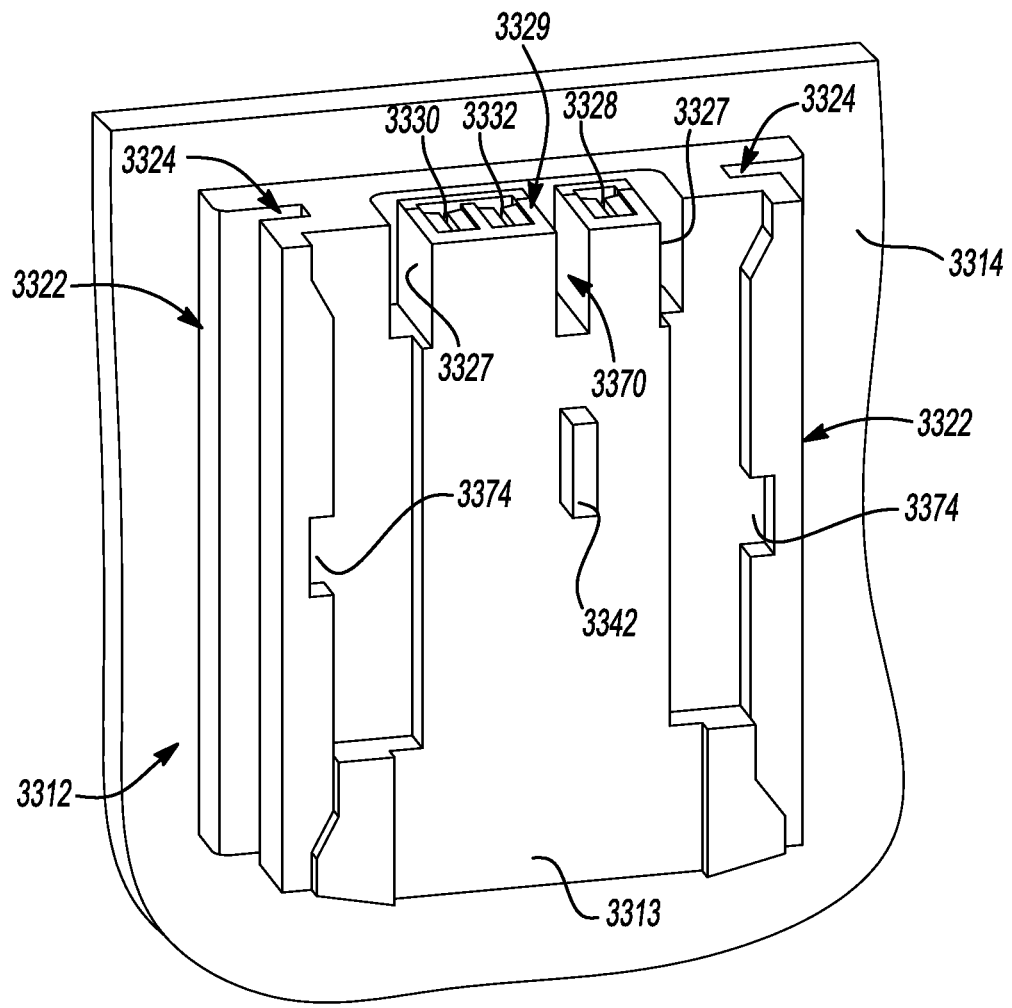
FIG. 35 is a partial perspective view of another alternative battery receptacle embodiment corresponding to the battery pack of FIGS. 33 and 34.

Referring to FIGS. 33-35, an exemplary rail-type battery receptacle 3312 can be coupled to a control panel 3314. The battery receptacle 3312 has two opposite lateral sides 3322, each with a longitudinally extending rail recess 3324 that is outwardly directed. The outwardly directed rail recesses are configured to cooperate with inwardly extending rails 3325 of a corresponding battery pack 3310. Two inwardly directed opposing latch recesses 3374 can be provided adjacent and above the rail recesses 3324. The latch recesses 3374 cooperate with latch projections 3368 of the battery pack 3310 to retain it in place. The latch projections 3368 are biased into a locked position (as illustrated) and can be moved inwardly toward each other into an unlocked position by manual actuation of two latch buttons 3372 by depressing them.

The receptacle 3312 can include a receptacle terminal block 3313 having a terminal end defined by two opposite lateral side walls 3327 and a terminal face 3329 extending generally perpendicular to and between the two opposite lateral side walls 3327. The receptacle terminal block 3313 can include three spring terminals 3328, 3330, 3332 associated with the terminal face 3329 for receiving three flat blade terminals 3334, 3336, 3338 of the battery pack 3310 to provide electrical connection therebetween. The outer terminal 3328 and 3330 adjacent each of the two opposite lateral side walls 3327 can correspond to the positive and negative battery terminals, respectively. The intermediate terminal 3332 can correspond to temperature sensing, which can be used during charging or discharging of the battery pack 3310. The positive and negative receptacle contacts 3328, 3330 and the temperature contact 3332 can be electrically coupled to a starting circuit, a charging circuit, or both.

The receptacle terminal block 3313 can also include a recess 3370 in an offset intermediate position of the terminal face 3329 between the positive and negative receptacle contacts 3328 3330. The battery pack 3310 can include an offset intermediate divider wall 3376 configured for insertion into the recess 3370 of the receptacle terminal block 3313. The receptacle 3312 can also include one or more keys in the form of elongated rectangular protrusions 3342. The key 3342 can be centrally located or laterally offset in order to insure a corresponding battery pack 3310 is received on the battery receptacle 3312 by cooperating with a key recess 3344 of the battery pack 3310.

A battery pack 3310 for a cordless power tool can be received in the receptacle 3312. The battery pack can include a battery terminal block 3335 associated with an end of a recessed area 3320 of an upper side of the battery pack 3310. The recessed area 3320 is defined on opposite lateral sides by the inwardly extending rails 3325 and at one end by the battery terminal block 3335. The battery pack 3310 can also include an inwardly directed coupling rail 3325 associated with each opposite lateral side of the recessed area 3320 and each rail 3325 being configured to cooperate with one of the rail recesses 3324 to couple the battery pack 3310 to the battery receptacle 3312.

Referring to FIGS. 36-39B, another exemplary battery receptacle 3612 for a rail-type battery pack 3610 is illustrated. The battery receptacle 3612 can have two opposite lateral sides 3622 and a receptacle terminal block 3613 coupled to the internal combustion engine via a coupling mechanism. The receptacle terminal block 3613 can include a terminal end defined by two opposite lateral side walls 3627 and a terminal face 3629 extending generally perpendicular to and between the two opposite lateral side walls 3627. A positive receptacle spring contact 3628 can be associated with the terminal face 3629 and adjacent one of the two opposite lateral side walls 3627 and a negative receptacle contact 3630 adjacent the other lateral side wall 3627.

The battery receptacle 3612 can also include a pair of arms providing an inwardly directed rail recess 3624 extending along each of the two opposite lateral sides 3622 of the battery receptacle 3612. As seen best in FIGS. 39A and 39B the rail recesses 3624 have a sloping wall 3624' that cooperates with a sloping wall 3625' of an outwardly directed rail 3625 of a corresponding battery pack 3610 to provide a friction fit therebetween. In addition, a key in the form of a projection 3623 can be provided below the battery rail 3625 on one or both lateral sides of the battery pack 3610. A cooperating key recess 3621 can be provided in association with the rail recess 3624 to enable a corresponding battery pack 3610 to be inserted into the battery receptacle 3612.

The battery pack 3610 can include a battery terminal block 3635 at the end of a recess 3620 in an upper side thereof. The recess 3620 is defined by the rails 3625 on opposite lateral sides and at its end by the terminal block 3635. The battery terminal block 3635 can include four substantially planar contacts 3634, 3636, 3638 extending perpendicular to and between a lower plate 3620' and an upper plate 3635'. In addition, a substantially planar plastic separating wall 3675 can be positioned in each of the outer spaces adjacent the positive and negative contacts 3634 and 3636, respectively. Each of the four contacts can provide different functions. In addition to the positive and negative contacts 3634 and 3636, respectively, discussed above, the middle pair of contacts 3638 can be used to provide a first and a second temperature readings from various points within the battery 3610. The temperature readings from these contacts can be used, for example, to shut down a charging operation if temperature readings outside a predetermined range are detected.

A pair of push buttons 3672 can be located on opposite lateral sides of the battery pack 3610. A movable latch member 3673 extends above the upper surface 3635' of the battery pack 3610 when it is in a latching position. In this position, the movable latch member 3673 can extend into a cooperating latch recess 3674 to retain the battery pack 3610 and the battery receptacle 3612 together. When a user manually actuates the push buttons 3672 the movable latch member 3673 is moved into an unlatching position in which the movable latch member does not extend above the upper surface 3635' of the battery pack 3610. As a result, the latch member 3673 is removed from the latch recess 3674 permitting uncoupling of the battery pack 3610 from the receptacle 3612.

In addition, a movable arm 3676 can be coupled to each of the push buttons 3672. A distal end 3676' of the arms 3676 is configured to push on a centrally located protrusion 3670 that is associated with the terminal end face 3629. Thus, the arms 3676 can help release the friction fit between the rail 3625 and rail recess 3625 upon actuation of the push buttons 3672.

Figure 40:
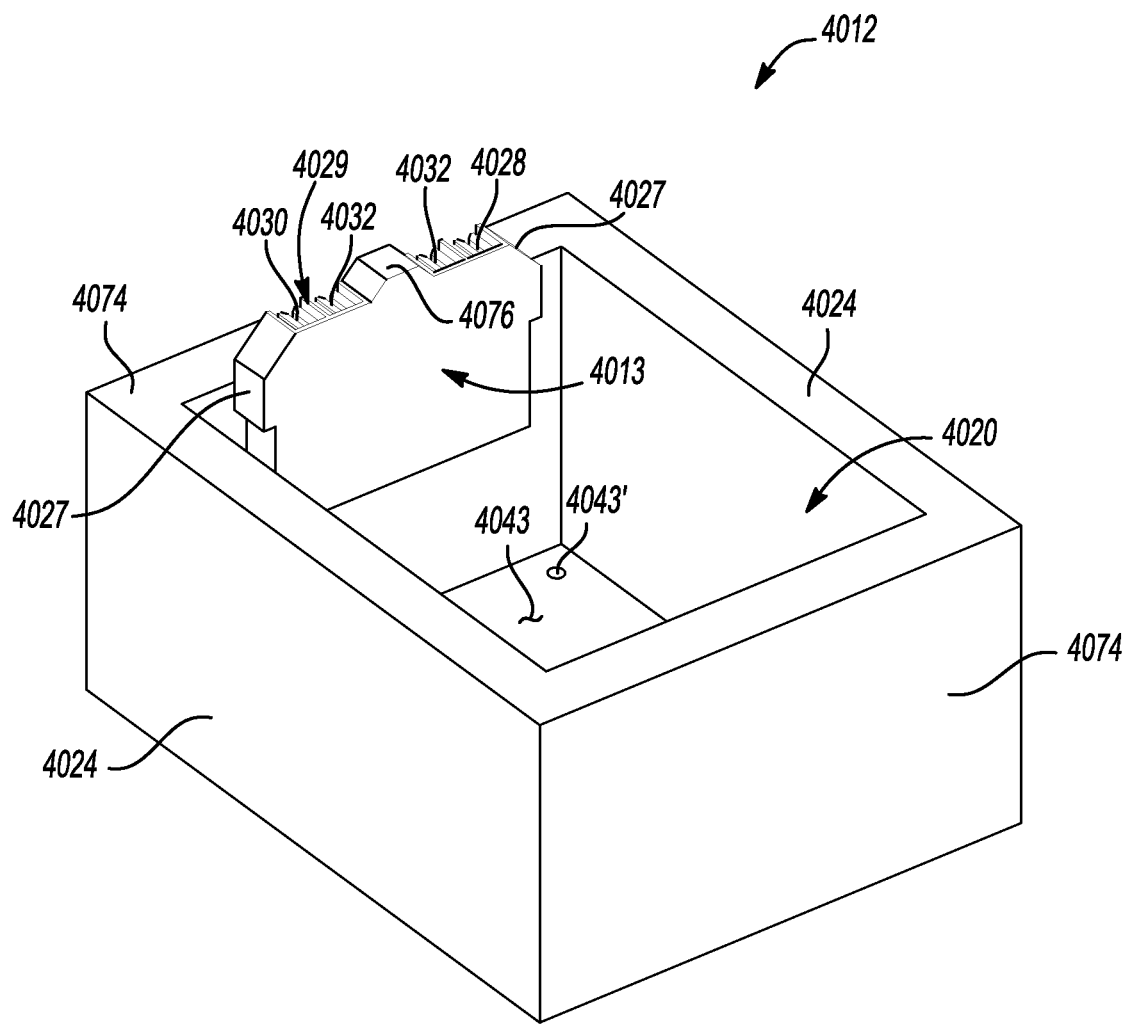
FIG. 40 is a perspective view of a different embodiment of a battery receptacle.

Referring to FIG. 40, another exemplary battery receptacle 4012 is illustrated. The battery receptacle 4012 is associated with the manually movable frame (such as 802 of FIG. 8). For example, the battery receptacle 4012 can rest on an upper surface or internal shelf of the movable frame. The battery receptacle 4012 can include an upwardly facing recess 4020 formed by two opposite lateral side walls 4024 and two end walls 4074 extending upwardly. This exemplary embodiment relies upon gravity and the upwardly extending walls 4024, 4074, rather than cooperating features of a battery pack for retention thereof. The walls 4024, 4074 provide a battery receptacle 4012 which can accommodate the outer dimensions of the battery pack.

A receptacle terminal block 4013 can be supported by one of the end walls 4074 and coupled to the internal combustion engine via a coupling mechanism. The receptacle terminal block 4013 can include a terminal end defined by two opposite lateral side walls 4027 and a terminal face 4029 extending generally perpendicular to and between the two opposite lateral side walls 4027. A positive receptacle contact 4028 can be adjacent one of the two opposite lateral side walls 4027 and a negative receptacle contact 4030 can be adjacent the other of the two opposite lateral side walls 4027.

Figure 36:
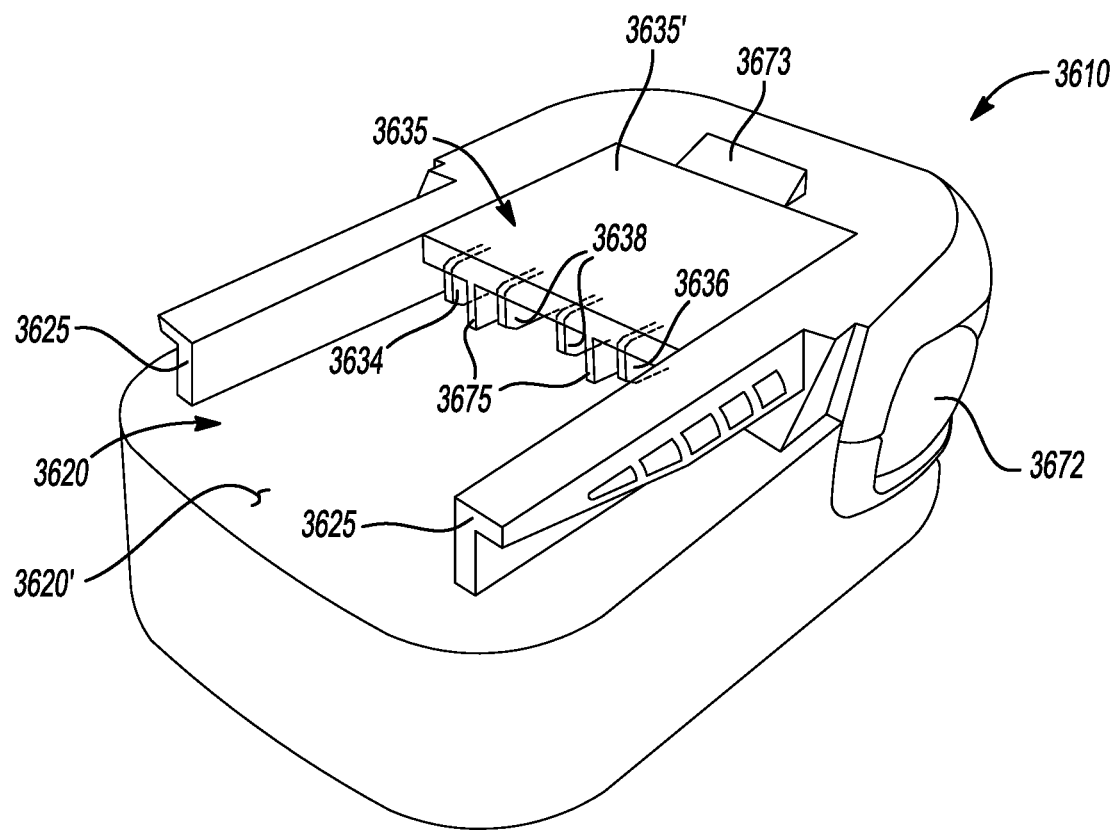
FIG. 36 is a perspective view of a battery pack corresponding to the battery receptacle of FIG. 38.
Figure 37:
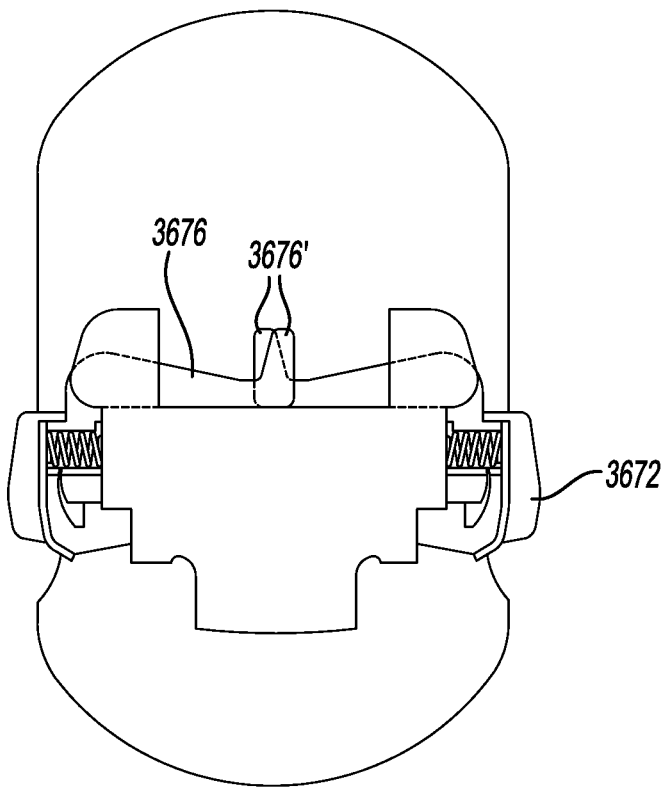
FIG. 37 is an interior bottom plan view of the Battery pack of FIG. 36.
Figure 38:
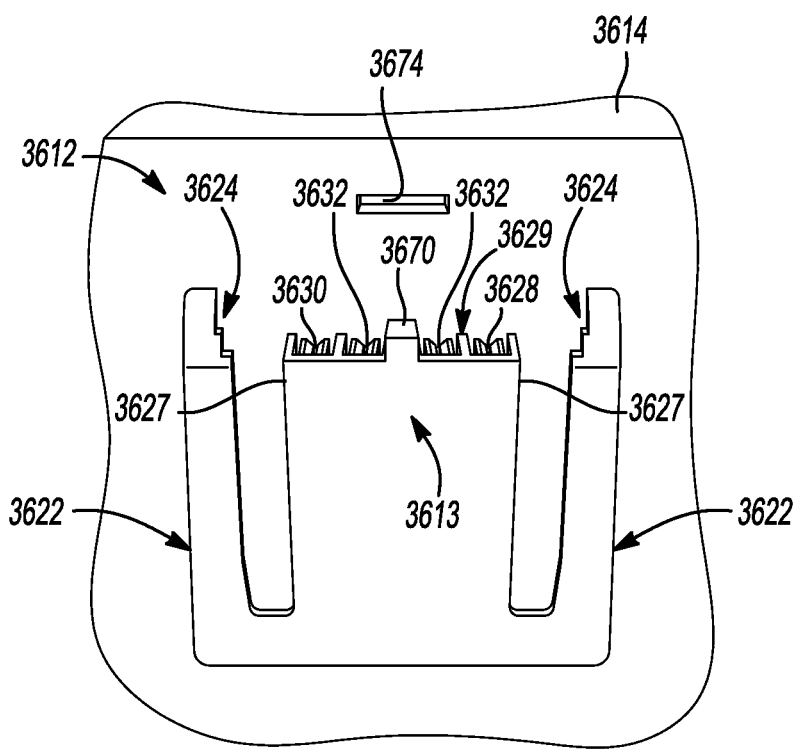
FIG. 38 is a partial perspective view of yet another alternative battery receptacle embodiment corresponding to the battery pack of FIGS. 36 and 37.

As illustrated herein, the receptacle terminal block 4013 and cooperating battery terminal block can, for example, be configured like those detailed in FIGS. 36-38. In such a case, the receptacle terminal block 4013 can include first and second temperature contacts 4032 and a protrusion 4076 centrally located between the contacts 4028, 4030, and 4032. Alternatively, the receptacle terminal block 4013 and cooperating battery terminal block of FIGS. 33-35 can be used. As yet additional alternatives, the terminal blocks and tower recesses of FIGS. 25-30 can be used.

In addition, the battery receptacle 4012 can include a plurality of drain holes 4043' in a floor 4043 of the battery receptacle 4012 for drainage. Alternatively, an open floor 4043 can be used. As yet another alternative, open walls or slots between the adjacent wall segments 4024 and 4074 can be provided.

Figure 41:
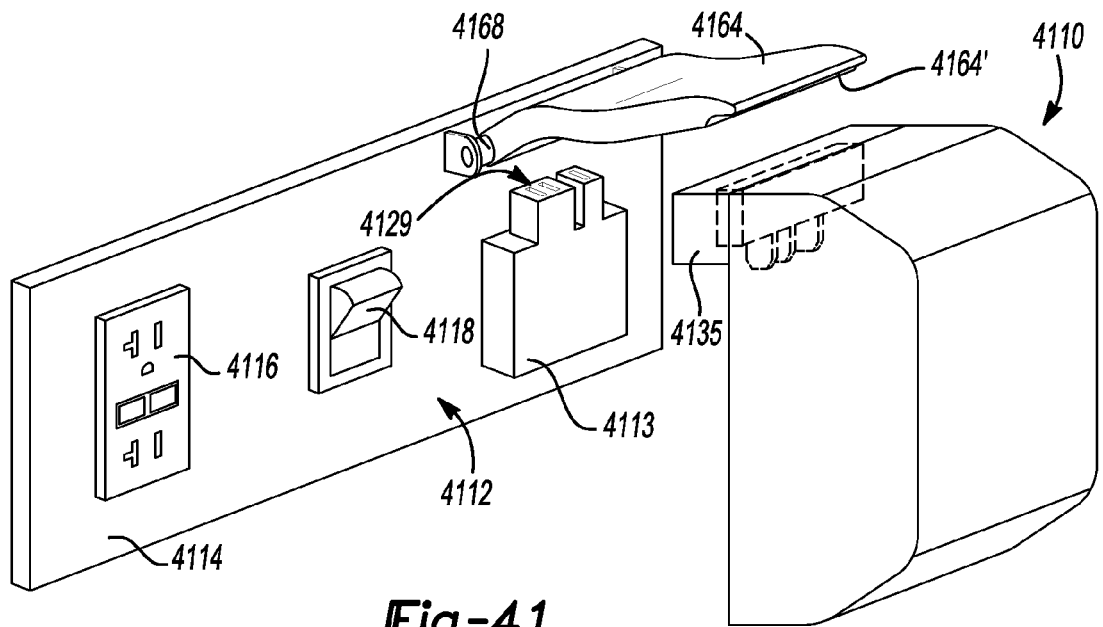
FIG. 41 is a perspective view of a control panel including an additional battery receptacle embodiment and corresponding battery pack.
Figure 42:
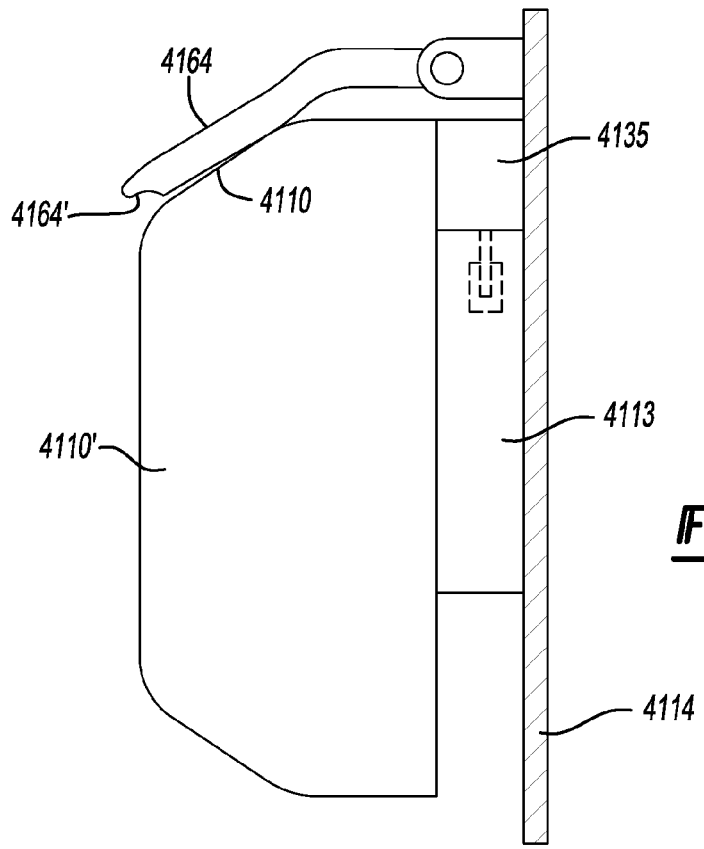
FIG. 42 is a side elevation view of the battery receptacle and corresponding battery pack of FIG. 41.

Referring to FIGS. 41 and 42, another exemplary battery receptacle 4112 is illustrated. This exemplary embodiment relies upon a movable spring loaded clip 4164 for maintaining the terminal blocks 4113 and 4135 in contact with each other, rather than cooperating features of the battery pack 4110 for retention thereof. A receptacle terminal block 4113 is associated with the manually movable frame. For example, the receptacle terminal block 4113 can be provided on a control panel 4114 including an AC outlet 4116 and a switch 4118. As seen in the drawings, the receptacle terminal block 4113 and battery terminal block 4135 of this embodiment can have cooperating terminal ends that are configured like those detailed in relation to FIGS. 33-35. Alternatively, the receptacle terminal block 4113 and battery terminal block 4135 can be configured with cooperating terminal ends like those of FIGS. 36-38.

The battery receptacle 4112 includes a movable retention clip 4164 biased toward a retention position (seen in FIG. 42) in which the retention clip 4164 exerts a biasing force on the battery pack 4110 to retain the contacts of the terminal blocks 4113 and 4135 in electrical communication. The retention clip 4164 can be manually moved into an open position (seen in FIG. 41) in which the battery pack 4110 may be uncoupled from the battery receptacle terminal block 4113 of the battery receptacle 4112.

To load a battery pack 4110 into the receptacle 4112, the movable clip 4164 is rotated upward to a loading and unloading position which permits movement of the battery pack 4110 to and from a received position as seen in FIG. 41. In the received position as seen in FIG. 42, the contacts of the battery terminal block 4135 cooperate with the contacts of the receptacle terminal block 4113 to provide electrical connection therebetween. The biased clip 4164 is then allowed to rotate downward into a retention position (seen in FIG. 42) under the biasing force of a biasing spring 4168. The movable clip 4164 retains the battery pack 4110 in the received position. The biasing force of the spring biased clip 4164 can act on an upper surface of the battery pack 4110 to exert a downward force on the battery pack 4110 that is generally toward the terminal face 4129 of the receptacle terminal block 4113.

The movable biased clip 4164 can be biased by a spring 4168 or other suitable biasing member. The spring clip 4164 can include a grasping edge provided by a thinned area 4164' at the distal end thereof. In addition, an inner surface of the spring clip 4164 can be configured to follow a corresponding battery pack surface 4110' when a battery 4110 and the movable clip 4164 are in the received position.

Figure 43:
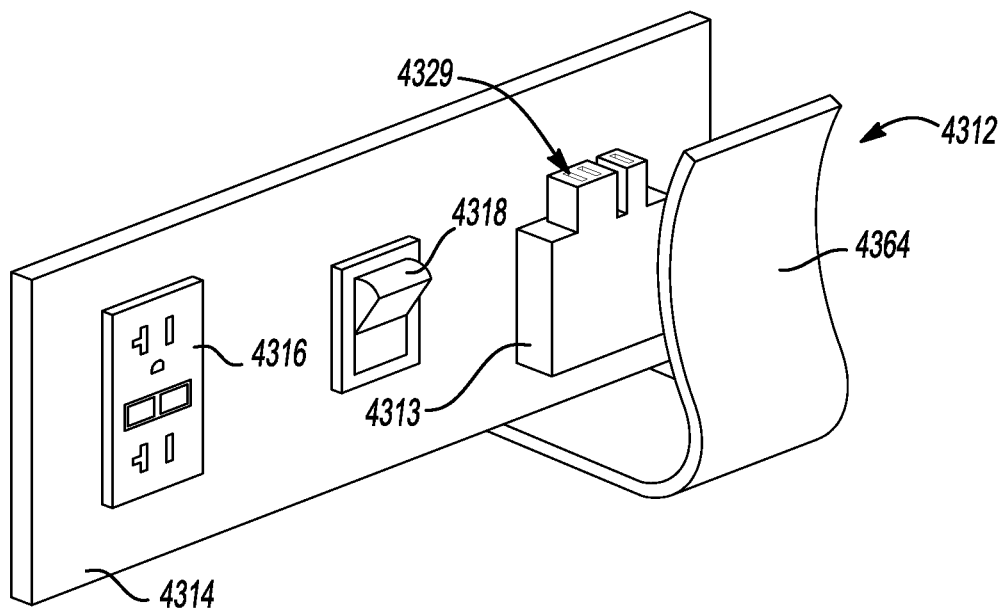
FIG. 43 is a perspective view of a control panel including a further battery receptacle embodiment.
Figure 44:
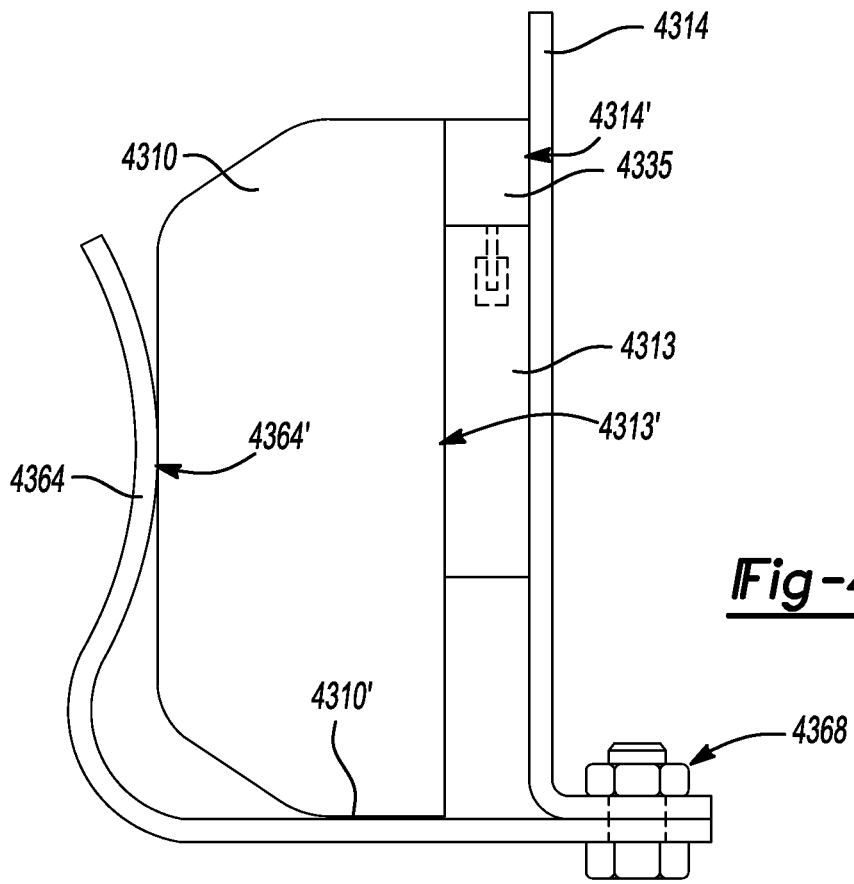
FIG. 44 is a side elevation view of the battery receptacle of FIG. 43 and corresponding battery pack.

Referring to FIGS. 43 and 44, yet another exemplary battery receptacle 4312 is illustrated. This exemplary embodiment relies upon a resilient clip 4364 for maintaining the terminal blocks 4313 and 4335 in contact with each other, rather than cooperating features of the battery pack 4310. A receptacle terminal block 4313 can be associated with a control panel 4314 including an AC outlet 4316 and a switch 4318 of the manually movable frame. As seen in the drawings, the receptacle terminal block 4313 and battery terminal block 4335 of this embodiment can have cooperating terminal ends that are configured like those detailed in relation to FIGS. 33-35. Alternatively, the receptacle terminal block 4313 and battery terminal block 4335 can be configured with cooperating terminal ends like those of FIGS. 36-38.

The battery receptacle can include a resilient clip having an empty position (seen in FIG. 43) in which the resilient clip 4364 is in a relaxed state when the battery pack 4310 is removed from the battery receptacle 4312. As a battery pack 4310 is inserted into the battery receptacle 4312, the resilient clip 4364 moves into a flexed position (seen in g FIG. 44) as a result of the resilient nature of the clip 4364. In this flexed position, the resilient clip 4364 exerts a force on the battery pack 4310 which generates friction, between the battery pack 4310 and the battery receptacle 4312. For example, friction can be generated between the battery back 4310 and surfaces 4364', 4313' and 4314' of the receptacle 4312. The force exerted on the battery pack 4310 by the resilient clip 4364 is in a direction generally parallel to the terminal face 4329 of the receptacle terminal block 4313.

This friction helps maintain the positive and negative battery contacts of the battery pack 4310 in electrical communication with the corresponding positive and negative contacts of the battery receptacle 4312. As oriented in FIGS. 43 and 44, gravity can additionally exert a force on the battery pack 4310 that is generally toward the terminal face 4329 of the receptacle terminal block 4313, further helping to maintain the cooperating contacts in electrical communication.

As illustrated in FIG. 44, the resilient clip 4364 is coupled to the control panel 4314 via a fastener 4368 in the form of a nut and bolt. Any other suitable coupling arrangement can be used, including providing these two components as integrated parts of a single piece of material. In addition, the resilient clip can be configured to contact a lower surface 4310' of the battery pack 4310 to at least partially support the weight of the battery pack 4310.

Figure 45:
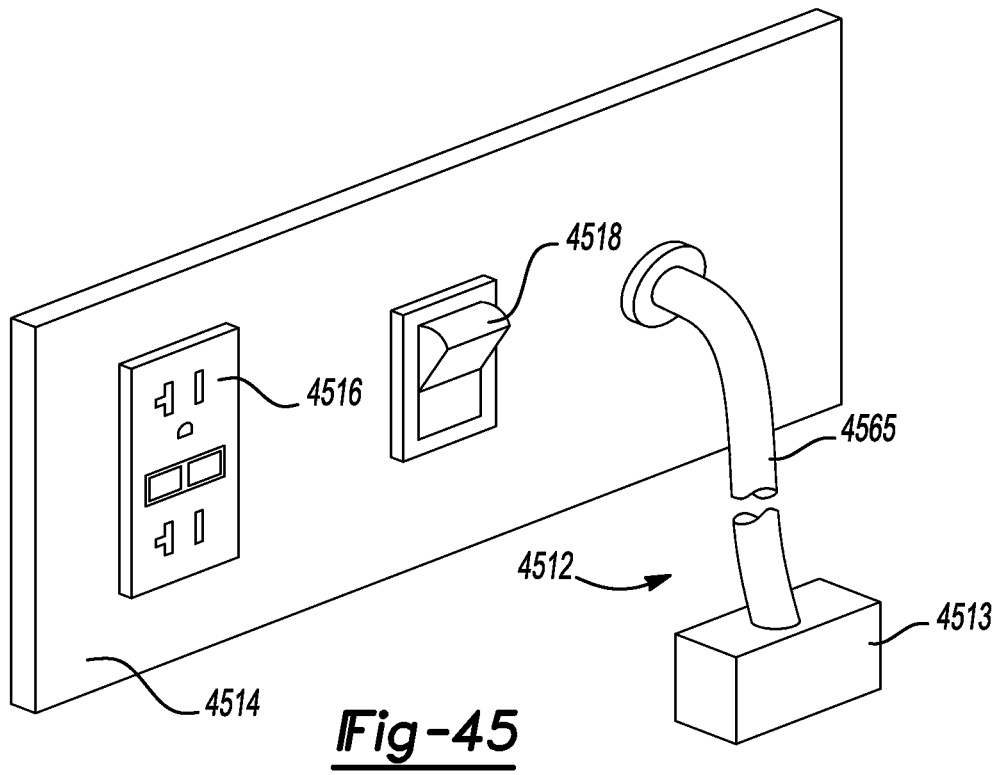
FIG. 45 is a perspective view of a control panel including a another receptacle terminal block embodiment.
Figure 46:
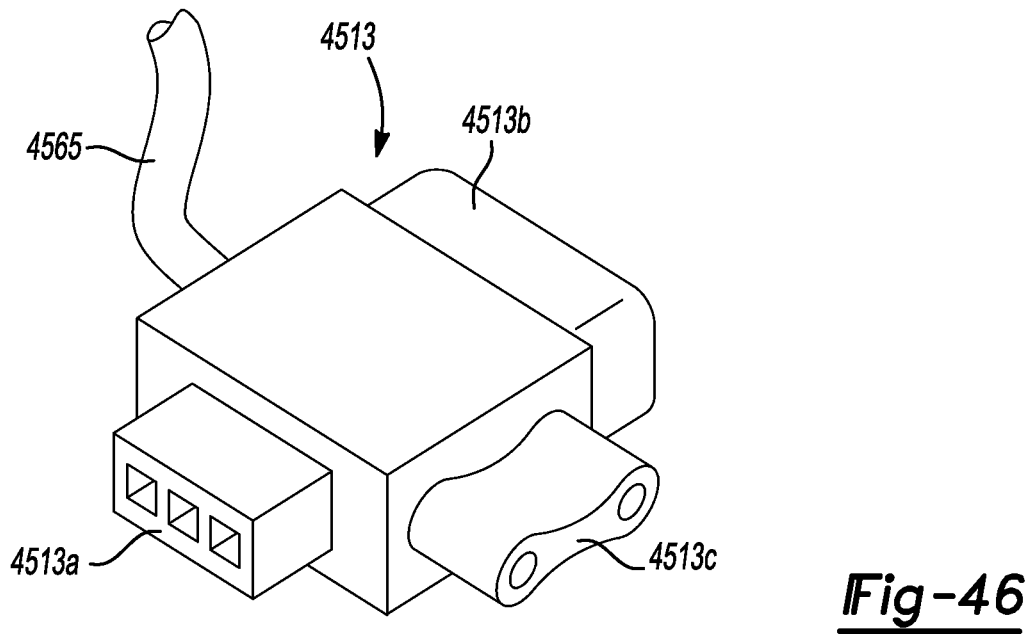
FIG. 46 is an enlarged perspective view of a terminal block like that of FIG. 45 including a plurality of different terminal ends, where each is configured to electrically couple with a different type of battery pack.

Referring to FIGS. 45 and 46, the battery receptacle 4512 can comprise a receptacle terminal block 4513 located at the end of a flexible cord 4565. The flexible electrical cord 4565 can be coupled to the movable frame via a control panel 4514 including an AC outlet 4516 and a switch 4518. The flexible cord 4565 can be long enough to permit electrical coupling between contacts of the terminal block 4513 and those of a battery pack 4510 located on the ground, on the top of a generator unit, or on a shelf provided on the generator unit. An overall battery receptacle in the form of a box with outer walls similar to that described above in FIG. 40 can additionally be used to keep the battery pack in place on the generator unit.

The terminal block 4513 can be configured to have a single terminal end, such as one of the terminal ends described in detail in relation to FIGS. 33-38. Alternatively, the terminal block 4513 can be configured as described in detail in relation to FIGS. 25-30 by providing a partial tower recess to cooperate with tower-type battery packs.

As seen in FIG. 46, the receptacle terminal block 4513 can include a plurality of terminal block ends 4513a, 4513b, and 4513c. For example, in the three end terminal block 4513a illustrated in FIG. 46, each terminal end 4513a, 4513b, and 4513c can be configured like one of the terminal ends of any of FIGS. 25-30 and 33-38. Specifically, terminal block end 4513a and corresponding battery terminal block can be configured as described in detail in relation to FIGS. 33-35. Terminal block end 4513c and corresponding battery terminal block can be configured as described in detail in relation to FIGS. 36-38. Terminal block end 4513b and corresponding battery terminal block can be configured as described in detail in relation to FIGS. 28-30. The friction, between the receptacle terminal block 4513 and the battery terminal block is used to retain these components in electrical contact.

Those skilled in the art should appreciate that many modifications can be made to the embodiments described herein. As one example, the receptacle terminal blocks can include only the positive and negative battery terminals. As another example, various features disclosed in one embodiment can be incorporated into other embodiments described herein. As one specific illustration of this, the three way terminal block of FIG. 46 can be used (minus the cord) in the embodiments of FIGS. 40-44, by permitting the terminal block to rotate on the control panel or wall so that the appropriate terminal block can extend upwardly. Similarly, it should be appreciated that other power driven apparatus may be adapted for use with the means for starting the internal combustion engine as disclosed herein.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An electro-mechanical device comprising:
an internal combustion engine supported on a manually movable frame;
at least one receptacle terminal block associated with the manually movable frame via a cord that extends from the frame with each receptacle terminal block located at an end of the cord spaced from the frame, each receptacle terminal block coupled to the internal combustion engine via a coupling mechanism, each receptacle terminal block comprising a terminal end defined by two opposite lateral side walls and a terminal face extending generally perpendicular to and between the two opposite lateral side walls, a positive receptacle contact being associated with the terminal face and adjacent one of the two opposite lateral side walls, a negative receptacle contact being associated with the terminal face and adjacent the other of the two opposite lateral side walls;
a battery pack for a cordless power tool having a battery terminal block associated with an end of a recessed area of an upper side of the battery pack, the battery terminal block comprising a positive battery contact located and configured to make electrical contact with the positive receptacle contact, and a negative battery contact located and configured to make electrical contact with the negative receptacle contact when the battery terminal block mates with the receptacle terminal block;
wherein the coupling mechanism is one of:
a starting circuit electrically coupling the positive and negative contacts to a starting device during a starting operation, the starting device being coupled to the internal combustion engine and being configured to start the internal combustion engine using electrical power provided by the cordless power tool battery pack during the starting operation;
a charging circuit electrically coupling the positive and negative contacts to a charging device during a charging operation, the charging device being coupled to the internal combustion engine and being configured to charge the cordless power tool battery pack during the charging operation;
or both.

2. The electro-mechanical device of claim 1, wherein the cord is long enough to permit the battery pack to rest on a ground surface adjacent the electro-mechanical device when the battery pack is coupled to the receptacle terminal block.

3. The electro-mechanical device of claim 1, wherein the receptacle terminal block comprises a recess in an offset intermediate position of the terminal face between the positive and negative receptacle contacts; and wherein the battery terminal block further comprises a divider wall in an offset intermediate position between the positive and negative battery contacts and configured to extend into the recess when the battery pack is inserted into the battery receptacle.

4. The electro-mechanical device of claim 3, wherein the receptacle terminal block further comprises a temperature receptacle contact associated with the terminal face and located between one of the first and second walls and the recess; and wherein the battery pack further comprises a temperature battery contact located between one of the positive and negative battery contacts and the divider wall, the temperature battery contact being configured to make electrical contact with the temperature receptacle contact.

5. The electro-mechanical device of claim 1, wherein the receptacle terminal block further comprises a first receptacle temperature contact associated with the terminal face and adjacent the positive receptacle contact, and a second receptacle temperature contact associated with the terminal face and adjacent the positive receptacle contact; and wherein the battery pack further comprises a first battery temperature contact configured to electrically couple with the first receptacle temperature contact and a second battery temperature contact configured to electrically couple with the second receptacle temperature contact, when the battery pack is received in the battery receptacle.

6. The electro-mechanical device of claim 5, wherein the receptacle terminal block further comprises a protrusion centrally located on the terminal face between the first and second receptacle temperature contacts; and wherein the battery pack further comprises an arm associated with a manually actuatable push button, and wherein the arm pushes on the protrusion to facilitate release of the battery pack from the battery receptacle, upon manual actuation of the push button.

7. The electro-mechanical device of claim 1, wherein at least two receptacle terminal blocks are provided.

8. The electro-mechanical device of claim 7, wherein one of the at least two receptacle terminal blocks further comprises a recess in an offset intermediate position of the terminal face between the positive and negative receptacle contacts.

9. The electro-mechanical device of claim 7, wherein one of the at least two receptacle terminal blocks further comprises a temperature receptacle contact associated with the terminal face and located between one of the positive and negative receptacle contacts and a recess in the terminal face; and wherein the other one of the at least two receptacle terminal blocks further comprises, a first receptacle temperature contact associated with the terminal face and adjacent the positive receptacle contact, and a second receptacle temperature contact associated with the terminal face and adjacent the positive receptacle contact and spaced away from the first receptacle contact.

10. The electro-mechanical device of claim 1 wherein at least one of the receptacle terminal blocks includes a plurality of terminal block ends with one of the terminal block ends configured to receive one type of battery terminal block and another of the terminal block ends configured to receive a different type of battery terminal block.

* * * * *